United States Patent
Huang et al.

(10) Patent No.: US 10,419,404 B2
(45) Date of Patent: *Sep. 17, 2019

(54) ENABLING COMPARABLE DATA ACCESS CONTROL FOR LIGHTWEIGHT MOBILE DEVICES IN CLOUDS

(71) Applicant: Arizona Board of Regents on Behalf of Arizona State University, Scottsdale, AZ (US)

(72) Inventors: Dijiang Huang, Chandler, AZ (US); Zhijie Wang, Tempe, AZ (US)

(73) Assignee: Arizona Board of Regents on Behalf of Arizona State University, Scottsdale, AZ (US)

(*) Notice: Subject to any disclaimer, the term of this patent is extended or adjusted under 35 U.S.C. 154(b) by 240 days.

This patent is subject to a terminal disclaimer.

(21) Appl. No.: 15/617,035

(22) Filed: Jun. 8, 2017

(65) Prior Publication Data
US 2017/0272411 A1 Sep. 21, 2017

Related U.S. Application Data

(62) Division of application No. 14/216,332, filed on Mar. 17, 2014, now Pat. No. 9,705,850.
(Continued)

(51) Int. Cl.
*H04L 29/06* (2006.01)
*G06F 21/62* (2013.01)
*H04L 9/30* (2006.01)

(52) U.S. Cl.
CPC ...... *H04L 63/0428* (2013.01); *G06F 21/6218* (2013.01); *H04L 9/3073* (2013.01);
(Continued)

(58) Field of Classification Search
CPC ... H04L 63/0428; H04L 63/06; H04L 63/102; H04L 9/3073; H04L 2209/805; G06F 21/6218

See application file for complete search history.

(56) References Cited

U.S. PATENT DOCUMENTS 5,081,678 A * 1/1992 Kaufman ............... H04L 9/0822
380/284
6,085,323 A * 7/2000 Shimizu ................ H04L 9/0822
380/277
(Continued)

OTHER PUBLICATIONS

Shucheng Yu et al, "Attribute-Based Content Distribution with Hidden Policy," 2008, IEEE, pp. 39-44. (Year: 2008).*
(Continued)

*Primary Examiner* — Azizul Choudhury
(74) *Attorney, Agent, or Firm* — Elliott, Ostrander & Preston, P.C.

(57) ABSTRACT

A new efficient framework based on a Constant-size Ciphertext Policy Comparative Attribute-Based Encryption (CCP-CABE) approach. CCP-CABE assists lightweight mobile devices and storing privacy-sensitive sensitive data into cloudbased storage by offloading major cryptography-computation overhead into the cloud without exposing data content to the cloud. CCP-CABE extends existing attribute-based data access control solutions by incorporating comparable attributes to incorporate more flexible security access control policies. CCP-CABE generates constant-size ciphertext regardless of the number of involved attributes, which is suitable for mobile devices considering their limited communication and storage capacities.

12 Claims, 7 Drawing Sheets

Related U.S. Application Data

(60) Provisional application No. 61/788,552, filed on Mar. 15, 2013.

(52) U.S. Cl.
CPC ............ *H04L 63/06* (2013.01); *H04L 63/102* (2013.01); *H04L 2209/805* (2013.01)

(56) References Cited

U.S. PATENT DOCUMENTS

| | | | | |
|---|---|---|---|---|
| 8,990,569 | B2 * | 3/2015 | Haynes | H04L 63/061 380/281 |
| 2002/0033838 | A1 * | 3/2002 | Krueger | G06F 9/44521 715/700 |
| 2009/0106549 | A1 * | 4/2009 | Mohamed | G06F 21/6218 713/156 |
| 2010/0064341 | A1 * | 3/2010 | Aldera | H04L 63/102 726/1 |
| 2012/0257756 | A1 | 10/2012 | Huang et al. | 380/281 |
| 2012/0258777 | A1 | 10/2012 | Huang et al. | 455/557 |

OTHER PUBLICATIONS

"Cynature Networking and Consulting, Inc.," available at http://www.cncinc.net/, accessed May 17, 2012, 2 pages.
"Eucalyptus," available at http://www.eucalyptus.com/, accessed May 17, 2012, 1 page.
"Identity 2.0," http://en.wikipedia.org/wiki/Identity 2.0, Dec. 15, 2011, accessed May 17, 2012, 3 pages.
"Minority graduate education at mountain states alliance (mcg@msa)," available at http://mati.eas.asu.edu:8421/MGE/brief.intro.html (2011), 88 pages.
"Opennebula," available at http://www.opennebula.org/, accessed May 17, 2012, 3 pages, 2012.
"Shibboleth Project," available at http://www.shibboleth.net, accessed May 17, 2012, 1 page.
"Tcg specification architecture overview," available at https://www.trustedcomputinggroup.org (2007), 54 pages.
"VMware vSphere," available at http://www.vmware.com/products/vsphere/, accessed May 17, 2012, 3 pages, 2012.
Abdalla et al., "Identity-based encryption gone wild," *Automata, Languages and Programming*, pp. 300-311, 2006.
Ahn et al., "Managing privacy preferences for federated identity management," Proceedings of the 2005 workshop on Digital identity management, 28-36 (2005).
Alrodhan and Mitchell, "A client-side CardSpace-Liberty integration architecture," Proceedings of the 7th symposium on Identity and trust on the Internet, 1-7 (2008).
Amazon, "Amazon elastic compute cloud," available at aws.amazon.com/ec2, accessed May 17, 2012, 14 pages.
Anwer et al., "A Fast, Virtualized Data Plane for the NetFPGA," pp. 1-5, (2009).
Armbrust et al., "Above the clouds: A berkeley view of cloud computing," EECS Department, University of California, Berkeley, Tech. Rep. UCB/EECS-2009-28, 25 pages, 2009.
Balakrishnan et al., "TWOACK: preventing selfishness in mobile ad hoc networks," Wireless Communications and Networking Conference, 6 pages, (2005).
Balan et al., "Tactics-based remote execution for mobile computing," ACM MobiSys, 14 pages, (2003).
Barreto et al., "Efficient and provably-secure identity-based signatures and signcryption from bilinearmaps," Advances in Cryptology-ASIACRYPT 2005, 515-532 (2005).
Basagni et al., "A distance routing effect algorithm for mobility (DREAM)," Proceedings of the 4th annual ACM/IEEE international conference on Mobile computing and networking, 76-84 (1998).
Beimel, "Secure schemes for secret sharing and key distribution," Ph.D. dissertation, PhD thesis, Israel Institute of Technology, Technion, Haifa, Israel, 115 pages, 1996.

Benaloh et al., "Patient Controlled Encryption: patient privacy in electronic medical records," Proceedings of the ACM workshop on Cloud computing security, 12 pages (2009).
Bethencourt, et al., "Ciphertext-policy attribute-based encryption," in Security and Privacy, 2007. SP'07. IEEE Symposium on. IEEE, pp. 321-334, 2007.
Bhargav-Spantzel et al., "User centricity: a taxonomy and open issues," Journal of Computer Security, 15(5): 493-527 (2007).
Biddle et al., "Browser Interfaces and Extended Validation SSL Certificates: An Empirical Study," Proceedings of the ACM workshop on Cloud computing security, 12 pages (2009).
Boneh and Wa Fers, "A fully collusion resistant broadcast, trace, and revoke system," Proceedings of the 13th ACM conference on Computer and communications security, :211-220 (2006).
Boneh and Waters, "Conjunctive, subset, and range queries on encrypted data", Theory of Cryptography, pp. 535-554, 2007.
Boneh et al., "Fully collusion resistant traitor tracing with short ciphertexts and private keys," Advances in Cryptology—EUROCRYPT 2006, :573-592 (2006).
Boneh et al., "Hierarchical identity based encryption with constant size ciphertext," Advances in Cryptology—EUROCRYPT 2005, pp. 440-456, 2005.
Boneh et al., "Identity-based encryption from the weil pairing," SIAM J. of Computing, 3: 586-615 (2003).
Boneh, et al., "Collusion Resistant Broadcast Encryption with Short Ciphertexts and Private Keys," Advances in Cryptology—Crypto 2005: 25th Annual International Cryptology Conference, Santa Barbara, California, USA, Aug. 14-18, 2005, Proceedings, 19 pages, 2005.
Bowers et al., "Proofs of retrievability: Theory and implementation," Proceedings of the ACM workshop on Cloud computing security (2009), 11 pages.
Bursziein et al., "TrackBack Spam: Abuse and Prevention," Proceedings of the ACM workshop on Cloud computing security (2009), 8 pages.
Camp et al., "Location information services in mobile ad hoc networks," IEEE International Conference on Communications, 7 pages (2002).
Canetti et al., "Efficient Communication—Storage Tradeoffs for Multicast Encryption," Advances in Cryptology—Eurocrypt; 99, 1592:459-474 (1999).
Canetti et al., "Multicast security: a taxonomy and some efficient constructions," INFOCOM'99. Eighteenth Annual Joint Conference of the IEEE Computer and Communications Societies. Proceedings. IEEE, 9 pages (1999)
Caronni et al., "Efficient security for large and dynamic multicast groups," Proceedings of the IEEE 7th International Workshop on Enabling Technologies: Infrastructure for Collaborative Enterprises (WET ICE; 98) 8 pages (1998).
Chang et al., "Key management for secure internet multicast using boolean function minimization techniques," in INFOCOM'99. Eighteenth Annual Joint Conference of the IEEE Computer and Communications Societies. Proceedings. IEEE. *IEEE*, pp. 689-698, 1999.
Chase et al., "Multi-authority Attribute Based Encryption," Lecture Notes in Computer Science, 4392: 515-534 (2007).
Cheung and Newport, "Provably secure ciphertext policy abe," Proceedings of the 14th ACM conference on Computer and communications security, p. 456-465 (2007).
Cheung et al., "Collusion-Resistant Group Key Management Using Attribute-Based Encryption," Technical report, Cryptology ePrint Archive Report 2007/161, pp. 1-15, (2007). http://eprint.iacr.org.
Chevallier-Mames et al., "Secure delegation of elliptic-curve pairing," *Smart Card Research and Advanced Application*, pp. 24-35, 2010.
Chong et al., "Multi-Tenant Data Architecture," Microsoft MSDN Document, available at http://msdn.microsoft.com/en-us/library/aa479086.aspx (2006), accessed May 17, 2012, 18 pages.
Chow et al., "Controlling data in the cloud: outsourcing computation without outsourcing control," Proceedings of the ACM workshop on Cloud computing security, 85-90 (2009).

(56) References Cited

OTHER PUBLICATIONS

Christodorescu et al., "Cloud security is not (just) virtualization security: a short paper," Proceedings of the ACM workshop on Cloud computing security, 97-102 (2009).
Chun and Maniatis, "Augmented Smartphone Applications Through Clone Cloud Execution," Proceedings of USENIX HotOS XII, pp. 1-5, (2009).
Covington et al., "A packet generator on the netfpga platform," IEEE Symposium on Field-Programmable Custom Computing Machines (FCCM), 4 pages, (2009).
Delerablee et al., "Fully collusion secure dynamic broadcast encryption with constant-size ciphertexts or decryption keys," *Pairing-Based Cryptography—Pairing 2007*, pp. 39-59, 2007.
Desmond NG et al., "Dynamic Balanced Key Tree Management for Secure Multicast Communications," IEEE Transactions on Computers, 56(5):590-605 (2007).
Dey and Abowd, "Towards a better understanding of context and context-awareness," Proceedings of the workshop on the what, who, where, and how of context-awareness, 304-307 (2000).
Di Vimercati et al., "Over-encryption: management of access control evolution on outsourced data," Proceedings of the 33rd international conference on Very large data bases, 123-134 (2007).
Ding et al., "A static-node assisted adaptive routing protocol in vehicular networks," Proceedings of the fourth ACM international workshop on Vehicular ad hoc networks, 59-68 (2007).
Dondeti et al., "Scalable secure one-to-many group communication using dual encryption," Computer Communications, 23(17):1681-1701 (2000).
Ducamp et al., "Linux's Security Capabilities," available at http://www.hsc.fr/ressources/presentations/linux2000/linux2000.htm.en (2000), 13 pages.
Emura et al., "A ciphertext-policy attribute-based encryption scheme with constant ciphertext length," Proceedings of the 5th International Conference on Information Security Practice and Experience, 13-23 (2009).
Enterprise, "Department of Defense Global Information Grid Architectural Vision," (2007), 37 pages.
Eriksson et al., "Truelink: A practical countermeasure to the wormhole attack in wireless networks," Proceedings of the 14th IEEE International Conference on Network Protocols, 75-84 (2000).
Fan et al., "Group key management with collusion-scalability tradeoffs using a hybrid structuring of receivers," Proceedings of the IEEE International Conference on Computer Communications Networks, pp. 196-201, (2002).
Fiat and Naor, "Broadcast Encryption," Advances in Cryptology-Crypto; 93. Lecture Notes in Computer Science, 773:480-491 (1994).
Gafni et al., "Efficient methods for integrating traceability and broadcast encryption," Lecture Notes in Computer Science, :372-387 (1999).
Garay et al., "Long-lived broadcast encryption," Lecture Notes in Computer Science, :333-352 (2000).
Goodrich et al., "Efficient tree-based revocation in groups of low-state devices," Lecture Notes in Computer Science, :511-527 (2004).
Goyal et al., "Attribute-based encryption for fine-grained access control of encrypted data," Proceedings of the 13th ACM conference on Computer and communications security, 89-98 (2006).
Goyal, "A lightweight secure cyber foraging infrastructure for resource-constrained devices," in Proceedings of the 6th IEEE Workshop on Mobile Computing Systems and Applications, 186-195 (2004).
Goyal, et al., "Bounded ciphertext policy attribute based encryption," Automata, Languages and Programming, pp. 579-591, 2008.
Guan et al., "A Survey of Research on Mobil Cloud Computing", 10th IEEE/ACIS International Conference on Computer Information Science, pp. 387-392, 2011.
Halevy et al., "The LSD broadcast encryption scheme," Lecture Notes in Computer Science, :47-60 (2002).
Harney et al., "Group key management protocol (GKMP) architecture," Technical report, RFC 2094 (1997), 22 pages.
Harney et al., "Group key management protocol (GKMP) specification," Technical report (1997), 23 pages.
Herranz et al., "Constant Size Ciphertexts in Threshold Attribute-Based Encryption", *Public Key Cryptography—PKC 2010*, p. 19-34, 2010.
Hodges et al., "Glossary for the OASIS Security Assertion Markup Language (SAML) V2.0," OASIS SSTC (Mar. 2005), 16 pages.
Hong et al., "Sat: Building new trust architecture for vehicular networks," Proceedings of the 3rd ACM International Workshop on Mobility in the Evolving Internet Architecture (MobiArch), pp. 31-36, (2008).
Hsu and Chen, "Secure File System Services for Web 2.0 Applications," Proceedings of the 2009 ACM workshop on Cloud computing security, 7 pages, (2009).
Hu et al., "Ariadne: A Secure On-Demand Routing Protocol for Ad Hoc Networks," Wireless Networks, 11(1): 21-38 (2005).
Hu et al., "Packet Leashes: A Defense against Wormhole Attacks in Wireless Ad Hoc Networks," Proceedings of IEEE Computer and Communications Societies (INFOCOM), 1976-1986 (2003).
Hu et al., "Rushing Attacks and Defense in Wireless Ad Hoc Network Routing Protocols," Proceedings of ACM Workshop on Wireless Security (WiSe), 30-40 (2003).
Hu et al., "SEAD: secure efficient distance vector routing for mobile wireless ad hoc networks," Ad Hoc Networks, 1(1): 175-192 (2003).
Huang and Kandiah, "Low-latency mix using split and merge operations," *J. Netw. Syst. Manage*, 18:244-264, 2010.
Huang and Kapoor, "Towards lightweight secure communication protocols for passive RFIDs," The 6th IEEE Communications Society Conference on Sensor, Mesh and Ad Hoc Communications and Networks (SECON), 9 pages, (2009).
Huang and Medhi, "A Byzantine Resilient Multi-path Key Establishment Scheme and Its Robustness Analysis for Sensor Networks," Proceedings of 5th IEEE International Workshop on Algorithms for Wireless, Mobile, Ad Hoc and Sensor Networks, 240b (2005), 8 pages.
Huang and Medhi, "A Key-chain Based Keying Scheme for Many-to-Many Secure Group Communication," ACM Transactions on Information and System Security, 7(4): 523-552 (2004).
Huang and Medhi, "A Secure Group Key Management Scheme for Hierarchical Mobile Ad-hoc Networks," Ad Hoc Networks, 6(4): 560-577 (2008).
Huang and Medhi, "Secure Pairwise Key Establishment in Large-scale Sensor Networks: an Area Partitioning and Multi-group Key Predistribution Approach," ACM Transactions on Sensor Networks, 3(3)(16), 34 pages, (2007).
Huang and Qin, "An Information Theoretic Approach for MANET Unlinkability Measure (ICME)," Proceedings of the Fourth International Conference on Mobile Computing and Ubiquitous Networking (2008), 8 pages.
Huang and Verma, "ASPE: attribute-based secure policy enforcement in vehicular ad hoc networks," Ad Hoc Networks, pp. 1526-1535 (2009).
Huang et al., "Secure Link State Routing Protocol: A Framework for Network Survivability", 20 pages, 2003.
Huang et al., "Strategies for Addressing Link State Routing Protocol Vulnerabilities: A Panoramic View", OSPF Vulnerabilities, 9 pages, (Year Unknown).
Huang et al., "A double authentication scheme to detect impersonation attack in link state routing protocols," Proceedings of IEEE International Conference on Communications (ICC), 1723-1727 (2003).
Huang et al., "Establishing email-based social network trust for vehicular networks," Proceedings of IEEE CCNC, Special Session on Social Networking, 5 pages, (2010).
Huang et al., "Gradual Identity Exposure Using Attribute-Based Encryption," Proceedings of the Second IEEE International Conference on Information Privacy, Security, Risk and Trust, pp. 881-888, (2010).
Huang et al., "Location-aware Key Management Scheme for Wireless Sensor Networks," Proceedings of ACM Workshop on Security of Ad Hoc and Sensor Networks (SASN), 29-42 (2004).
Huang et al., "Mobicloud: Building secure mobile cloud framework for pervasive mobile computing and communication," in Proceed-

(56) References Cited

OTHER PUBLICATIONS ings of 5th IEEE International Symposium on Service-Oriented System Engineering, pp. 27-34, (2010).
Huang et al., "Modeling Pairwise Key Establishment for Random Key Predistribution in Large-scale Sensor Networks," IEEE/ACM Transactions on Networking, 15(5): 1204-1215 (2007).
Huang et al., "New Architecture for Intra-Domain Network: Developing an effective platform for deterring network attacks," Communications of the ACM, 49(11): 64-72 (2006).
Huang et al., "On Providing Confidentiality in Link State Routing Protocol," Proceedings of IEEE Consumer Communications and Networking Conference, 671-675 (2006).
Huang et al., "Secure Data Processing Framework for Mobile Cloud Computing," IEEE Infocom Workshop on Cloud Computing, 620-624 (2011).
Huang et al., "Source Routing Based Pairwise Key Establishment Protocol for Sensor Networks," Proceedings of 24th IEEE International Performance Computing and Communications Conference, 177-183 (2005).
Huang et al., "Trust Analysis of Link State Network Routing," Proceedings of 2nd International Workshop on Trust Internet (TIW), 10 pages, (2003).
Huang, "A Pseudonym-Based Cryptography for Anonymous Communications in Mobile Ad-hoc Networks," Special Issue on Cryptography in Networks, International Journal of Security and Networks (IJSN), 2(3-4): 272-283 (2007).
Huang, "An Identity-Based Blind Key Generation and Signature Scheme," Proceedings of Conference on Information Security and Cryptology (CISC), 65-73 (2005).
Huang, "Identity-based Cryptography for Admissible and Anonymous Communications", pp. 1-13, 2005.
Huang, "On An Information Theoretic Approach to Model Anonymous MANET Communications," Proceedings of the IEEE International Symposium on Information Theory (ISIT), 1629-1633 (2009).
Huang, "On Measuring Anonymity for Wireless Mobile Ad-hoc Networks," Proceedings of 2nd IEEE International Workshop on Performance and Management of Wireless and Mobile Networks (P2MNet), 779-786 (2006).
Huang, "Secure Multi-Path Data Deliver in Sensor Networks", IEEE, 7 pages, 2009.
Huang, "Traffic Analysis-based Unlinkability Measure for IEEE 802.11b-based Communication Systems," Proceedings of ACM Workshop on Wireless Security (WiSe), 65-74 (2006).
Huang, "Unlinkability Measure for IEEE 802.11 Based MANETs," IEEE Transactions on Wireless Communications, 7(3): 1025-1034 (2008).
Huang, "Using Delaunay Triangulation to Construct Obstacle Detour Mobility Model," Proceedings of IEEE Wireless Communications and Networking Conference (WCNC), 1644-1649 (2005).
Hunt and Scott, "The coign automatic distributed partitioning system," Proceedings of USENIX Symposium on Operating Systems Design and Implementation (OSDI), pp. 1-14, (1999).
IETF PIIX Working Group, "Public-key infrastructure (x.509) (pkix)," available at http://www.ietf.org/html.charters/pkix-charter.html, Internet RFCs, accessed May 17, 2012, 2 pages.
Jain et al., "Geographical routing using partial information for wireless ad hoc networks," Personal Communications, IEEE, 8(1): 48-57 (2001).
Johnson et al., "The dynamic source routing protocol (dsr) for mobile ad hoc networks for ipv4," IETF RFC4728 (2007), 108 pages.
Josang and Pope, "User centric identity management," AusCERT Asia Pacific Information Technology Security Conference, pp. 1-13, (2005).
Juang et al., "Energy-efficient computing for wildlife tracking: design tradeoffs and early experiences with ZebraNet," ACM SIGPLAN Notices, 37(10): 96-107 (2002).

Julien, "Context-Aware Middleware Abstractions for Ad Hoc Mobile Computing," URL: http://www.cse.wustl.edu/mobilab/pubs/proposal.pdf (2003), 14 pages.
Kandiah et al., "C-Mix: A lightweight Anonymous Routing Approach," Proceedings of Information Hiding (2008), 15 pages.
Kandiah et al., "Re-distribution of Traffic Flow in Mix Networks—Split Mix," Arizona State University, available at http://snac.eas.asu.edu/snac/document/split.pdf (2008), pp. 1-18.
Kannhavong et al., "A study of a routing attack in OLSR-based mobile ad hoc networks," International Journal of Communication Systems, 20(11): 1245-1261 (2007).
Kapoor and Huang, "Secret-sharing based secure communication protocols for passive rfids," Proceedings of IEEE Globecom, CISS, 1-9 (2009).
Karp and Kung, "GPSR: Greedy Perimeters Stateless Routing for Wireless Network," Proceedings of ACM/IEEE Mobicom, 243-254 (2000).
Katz et al., "Predicate encryption supporting disjunctions, polynomial equations, and inner products," *Advances in Cryptology—EUROCRYPT*, 4965:146-162 (2008).
Klein et al., "Access schemes for mobile cloud computing," in *2010 Eleventh International Conference on Mobile Data Management (MDM)*, pp. 387-392, 2010.
Ko and Vaidyia, "Location-Aided Routing (LAR) in mobile ad hoc networks," Wireless Networks, 6(4): 307-321 (2000).
Korkmaz et al., "Urban mutli-hop broadcast protocol for inter-vehicle communication systems," Proceedings of the 1st ACM international workshop on Vehicular ad hoc networks, 76-85 (2004).
Kurosawa et al., "Detecting Blackhole Attack on AODV-Based Mobile Ad Hoc Networks by Dynamic Learning Method," IEIC Technical Report, 105(627): 65-68 (2006).
Lagerspetz and Tarkoma, "Mobile search and the cloud: The benefits of offloading," in *2011 IEEE International Conference on Pervasive Computing and Communications Workshops (PERCOM Workshops)*, pp. 117-122, 2011.
Lamport et al., "The Byzantine Generals Problem," ACM Transactions on Programming Languages and Systems, 4(3): 382-401 (1982).
Lee et al., "Efficient Public Key Broadcast Encryption Using Identifier of Receivers", ISPEC 2006, LNCS 3903, pp. 153-164, 2006.
Lee et al., "Pervasive Forensic Analysis based on Mobile Cloud Computing", 2011 Third International Conference on Multimedia Information Networking and Security, pp. 572-576, 2011.
Lewko et al., "Fully secure functional encryption: Attribute-based encryption and (hierarchical) inner product encryption," *Advances in Cryptology—EUROCRYPT 2010*, pp. 62-91, 2010.
Li and Kim, "Attribute-Based Ring Signatures," IACR ePrint (2008), 16 pages.
Li et al., "A scalable location service for geographic ad hoc routing," Proceedings of the 6th annual international conference on Mobile computing and networking, 120-130 (2000).
Li et al., "Batch rekeying for secure group communications," Proceedings of the 10th international conference on World Wide Web, :525-534 (2001).
Li et al., "Deploying Mobile Computation in Cloud Service," Proceedings of the First International Conference for Cloud Computing (CloudCom), 11 pages, (2009).
Liang et al., "On Economic Mobile Cloud Computing Model," Lecture Notes of the Institute for Computer Sciences, Social Informatics and Telecommunications Engineering, 76: 329-341 (2012).
Liang et al., "Proyably Secure and Efficient Bounded Ciphertext Policy Attribute Based Encryption", Proceedings of the 4$^{th}$ International Syposium on Information, Computer and Communications Security, pp. 343-352, 2009.
Liu and Issarny., "Enhanced Reputation Mechanism for Mobile Ad Hoc Networks," Lecture Notes in Computer Science, 48-62 (2004).
Liu et al., "Effcient self-healing group key distribution with revocation capability," Proceedings of the 10th ACM conference on Computer and communications security, :231-240 (2003).
Liu et al., "Public Key Broadcast Encryption with Low Number of Keys and Constant Decryption Time", 14 pages, 2008.

(56) References Cited

OTHER PUBLICATIONS

Lockwood et al., "Net FPGA—an open platform for gigabit-rate network switching and routing," IEEE International Conference on Microelectronic Systems Education, 2 pages, (2007).

Lubicz and Sirvent, "Attribute-based broadcast encryption scheme made efficient," *Progress in Cryptology—AFRICACRYPT 2008*, pp. 325-342, 2008.

Lynn, "On the implementation of pairing-based cryptosystems". PhD thesis, Stanford University, http://crypto.stanford.edu/pbc/thesis.pdf (2007), 126 pages.

Lyons et al., "Context-aware composition," Proceedings of the 10th workshop on Mobile Computing Systems and Applications, 12, 6 pages, (2009).

Lyons et al., "Multi-display Composition: Supporting Display Sharing for Collocated Mobile Devices," Proceedings of the 12th IFIP TC 13 International Conference on Human-Computer Interaction: Part I (2009), 14 pages.

Maihofer et al., "Abiding geocast: time-stable geocast for ad hoc networks," Proceedings of the 2nd ACM international workshop on Vehicular ad hoc networks, 20-29 (2005).

Malakooti and Thomas, "Multiple Criteria Network Routing with Simulation Results," Proc. 15th Industrial Engineering Research Conference (IERC), pp. 42-47, (2006).

Marti et al., "Mitigating Routing Misbehavior in Mobile Ad Hoc Networks," Proceedings of the 6th annual international conference on Mobile computing and networking, 255-265 (2000).

Mascolo and Musolesi, "SCAR: context-aware adaptive routing in delay tolerant mobile sensor networks," Proceedings of the 2006 international conference on Wireless communications and mobile computing, ACM, 538, 6 pages (2006).

Mccluskey, "Minimization of Boolean functions," Bell System Technical Journal, 35(5): 1417-1444 (1956).

Mcgrew and Sherman, "Key establishment in large dynamic groups using one-way function trees," Manuscript submitted to IEEE Transactions on Software Engineering. A full version of the paper appears in http://download.nai.com/products/media/nai/misc/oft052098.ps (1998), 13 pages.

Medhi and Huang, "Secure and Resilient Routing: A Framework for Resilient Network Architectures," Information Assurance: Dependability and Security in Network Systems, Morgan Kaufmann Publishers (2007), 34 pages.

Merrels, "DIX: Digital Identity Exchange Protocol," Internet Draft (Mar. 2006), 31 pages.

Messer et al., "Towards a distributed platform for resource-constrained devices," International Conference on Distributed Computing Systems, 22: 43-51 (2002).

Miettinen and Nurminen, "Energy efficiency of mobile clients in cloud computing," in *Proceedings of the 2nd USENIX conference on Hot topics in cloud computing*, ser. HotCloud'10. Berkeley, CA, USA: USENIX Association, 7 pages, 2010.

Mittra, "Iolus: A framework for scalable secure multicasting," ACM SIGCOMM Computer Communication Review, 27(4):277-288 (1997).

Miyaji et al., "New explicit conditions of elliptic curve traces for FR-reduction," IEICE Transactions on Fundamentals of Electronics, Communications and Computer Sciences, 84(5):1234-1243 (2001).

Moyer et al., "A survey of security issues in multicast communications," Network, IEEE, 13(6)12-23 (1999).

Musolesi and Mascolo, "CAR: Context-Aware Adaptive Routing for Delay—Tolerant Mobile Networks," IEEE Transactions on Mobile Computing, 8(2): 246-260 (2009).

Mutaf, "Pocket Bluff: A cooperation enforcing scheduled pocket switching protocol," Institut National de Recherche en Informatique et en Automatique, Technical Report No. 5664 (2005), 18 page.

Naor and Pinkas, "Efficient trace and revoke schemes," Financial cryptography: 4th international conference, FC 2000, Anguilla, British West Indies, Feb. 20-24, 2000: proceedings, pp. 1-20, 2001. Springer Verlag.

Naor et al., "Revocation and tracing schemes for stateless receivers," Lecture Notes in Computer Science, 41-62 (2001).

Ni et al., "Determination of optimal call admission control policy in wireless networks," IEEE Transactions on Wireless Communications, 8(2): 1038-1044 (2009).

Ning and Sun, "How to misuse AODV: a case study of insider attacks against mobile ad-hoc routing protocols," Ad Hoc Networks, 3(6): 795-819 (2005).

Nishide et al., "Attribute-based encryption with partially hidden encryptor-specific access structures", *Applied Cryptography and Network Security*, 5037:111, 2008.

OASIS Working Draft, "An introduction to XRIs" (2005), 25 pages.

Oberheide, "Virtualized in-cloud security services for mobile devices," in Proceedings of the First Workshop on Virtualization in Mobile Computing, 31-35 (2008).

Ostrovsky et al., "Attribute-based encryption with non-monotonic access structures," Proceedings of the 14th ACM conference on Computer and communications security, 195-203 (2007).

Papadimitratos and Haas, "Secure Routing for Mobile ad hoc Networks," SCS Communication Networks and Distributed Systems Modeling and Simulation Conference (CNDS), 1-27 (2002).

Pering et al., "Enabling pervasive collaboration with platform composition," Pervasive Computing, 184-201 (2009).

Perkins and Roger, "Ad Hoc On Demand Distance Vector (AODV) Routing," IETF RFC3561 (2003), 11 pages.

Perrig et al., "A New Protocol for Efficient Large-Group Key Distribution," IEEE Symposium on Security and Privacy, 247-262 (2001).

Pirretti et al., "Secure attribute-based systems," Proceedings of the 13th ACM conference on Computer and communications security, 99-112 (2006).

Poovendran and Baras, "An information-theoretic approach for design and analysis of rooted-tree-based multicast key management schemes," *IEEE Transactions on Information Theory*, 47(7):2824-2834, 2001.

Qin and Huang, "STAR: A Statistical Traffic Pattern Discovery System for MANET Communications," MILCOM, 9 pages, (2009).

Qin et al., "OLAR: On-demand Lightweight Anonymous Routing in MANETs," The Fourth International Conference on Mobile Computing and Ubiquitous Networking (ICMU), 8 pages, (2008).

Qin et al., "VehiCloud: Cloud Computing Facilitating Routing in Vehicular Networks," Infocom, 10 pages, (2011).

Rafaeli and Hutchinson, "A survey of key management for secure group communication," ACM Computing Surveys (CSUR), 35(5):309-329 (2003).

Raj et al., "Resource management for isolation enhanced cloud services," Proceedings of the 2009 ACM workshop on Cloud computing security, pp. 77-84, (2009).

Ramachandran et al., "Computing Cryptographic Algorithms in Portable and Embedded Devices," Portable Information Devices, 2007. PORTABLE07. IEEE International Conference on, 25-29:1-7 (2007).

Ramjee et al., "On optimal call admission control in cellular networks," Wireless Networks, 3(1): 29-41 (1997).

Raykova et al., "Secure Anonymous Database Search," Proceedings of the ACM workshop on Cloud computing security, 4 pages, (2009).

Recordon and Reed, "OpenID 2.0: a platform for user-centric identity management," Proceedings of the second ACM workshop on Digital identity management, 16:11-15 (2006).

Refaei et al., "A Reputation-based Mechanism for Isolating Selfish Nodes in Ad Hoc Networks," Proceedings of the IEEE Annual International Conference on Mobile and Ubiquitous Systems: Networking and Services (MOBIQUITOUS), 9 pages, (2005).

Ristenpart et al., "Hey, You, Get Off of My Cloud: Exploring Information Leakage in Third-Party Compute Clouds," ACM Conference on Computer and Communications Security. 14 pages, (2009).

Riva et al., "Context-aware migratory services in ad hoc networks," IEEE Transactions on Mobile Computing, 1313-1328 (2007).

Safavi-Naini and Wang, "New constructions for multicast re-keying schemes using perfect hash families," Proceedings of the 7th ACM conference on Computer and communications security, pp. 228-234. ACM New York, NY, USA (2000).

(56) References Cited

OTHER PUBLICATIONS

Sahai and Wafers, "Fuzzy Identity-Based Encryption," *Advances in Cryptology—Eurocrypt*, 3494:457-473, 2004.
Sandhu et al., "Role-based access control models," Computer, 29(2): 38-47 (1996).
Santos et al., "Towards trusted cloud computing," Proceedings of USENIX HotCloud, 5 Pages, (2009).
Sanzgiri et al., "A secure routing protocol for ad hoc networks," Proceedings of the 10th IEEE International Conference on Network Protocols, 78-87 (2002).
Sasao, "Bounds on the average number of products in the minimum sum-of-products expressions for multiple-value input two-valued output functions," IEEE Transactions on Computers, 40(5): 645-651 (1991).
Secure Networking and Computing Research Group (SNAC), "MobiCloud," available at http://mobicloud.asu.edu (2010), Accessed May 15, 2012, 1 page.
Shamir, "How to Share a Secret," Communications of the ACM, 22(11): 612-613 (1979).
Sherman and Mcgrew, "Key Establishment in Large Dynamic Groups Using One-Way Function Trees," *IEEE Transactions on Software Engineering*, 29(5):444-458, 2003.
Yu et al. "Attribute-based Content Distribution with Hidden Policy," 2008, *IEEE*, 39-44.
Snoeyink et al., "A lower bound for multicast key distribution," Computer Networks, 47(3):429-441 (2005).
Su et al., "Haggle: Clean-slate networking for mobile devices," Technical Report, UCAM-CL-TR-680, University of Cambridge, 30 pages, (2006).
Sun et al., "Information theoretic framework of trust modeling and evaluation for ad hoc networks," IEEE Journal on Selected Areas in Communications, 24(2): 305-317 (2006).
Tseng et al., "A Specification-Based Intrusion Detection Model for OLSR," Lecture Notes in Computer Science, 3858: 300 (2006).
Verma et al., "Pseudo-IDM: an Anonymous Solution for Identity Management," Arizona State University, available at http://snac.eas.asu.edu/snac/document/pseudonym.pdf (2008).
Wallner et al., "Key Management for Multicast: Issues and Architectures RFC 2627," IETF (1999).
Wang et al., "An effective intrusion detection approach for OLSR MANET protocol," 1st IEEE ICNP Workshop on Secure Network Protocols, 55-60 (2005).
Wang et al., "Secure and efficient access to outsourced data," Proceedings of the ACM workshop on Cloud computing security, 55-66 (2009).
Want et al., "Dynamic composable computing," Proceedings of the 9th workshop on Mobile computing systems and applications, 17-21 (2008).
Waters, "Ciphertext-policy attribute-based encryption: An expressive, efficient, and provably secure realization," ePrint report, 29 (2008).
Wei et al., "Managing security of virtual machine images in a cloud environment," Proceedings of the ACM workshop on Cloud computing security, 91-96 (2009).
Wenning et al., "A Generic Framework for Context-Aware Routing and its Implementation in Wireless Sensor Networks," ITG-Fachbericht-Mobilkommunikcation-Technologien und Anwendungen (2009).
Williams and Huang, "A Group Force Mobility Model," Proceedings of 29th Annual Simulation Symposium, 333-340 (2006).
Williams and Huang, "Group force mobility model and its obstacle avoidance capability," Journal of the International Academic of Astronautics, Acta Astronautica, 65(7-8): 949-957 (2009).
Williams et al., "Group Force Mobility Models and Their Obstacle Avoidance Capability," Proceedings of the 57th International Astronautically Congress (2006), 8 pages.
Wong et al., "Secure group communications using key graphs," IEEE/ACM Transactions on Networking, 8(1):16-30 (2000).
Wu et al., "MDDV: a mobility-centric data dissemination algorithm for vehicular networks," Proceedings of the 1st ACM international workshop on Vehicular ad hoc networks, 47-56 (2004).
Wyse, "Applying Location-Aware Linkcell-Based Data Management to Context-Aware Mobile Business Services," International Conference on the Management of Mobile Business (ICMB), 8 pages, (2007).
Yadumurthy et al., "Reliable MAC broadcast protocol in directional and omni-directional transmissions for vehicular ad hoc networks," Proceedings of the 2nd ACM international workshop on Vehicular ad hoc networks, 10-19 (2005).
Yang et al., "Reliable group rekeying: a performance analysis," Proceedings of the 2001 conference on Applications, technologies, architectures, and protocols for computer communications, 27-38 (2001).
Yu et al., "Attribute-based content distribution with hidden policy," in *Secure Network Protocols*, 2008. NPSec 2008. $4^{th}$ Workshop on. *IEEE*, pp. 39-44, 2008.
Yu et al., "Attribute-based on-demand multicast group setup with membership anonymity," in Proceedings of the 4th international conference on Security and privacy in communication networks. ACM, 6 pages, 2008.
Yun et al., "On protecting integrity and confidentiality of cryptographic file system for outsourced storage," Proceedings of the ACM workshop on Cloud computing security, 67-76 (2009).
Zapata et al., "Securing ad hoc routing protocols," Proceedings of the 3rd ACM workshop on Wireless security, 1-10 (2002).
Zhang et al., "Securing elastic applications on mobile devices for cloud computing," in Proceedings of the 2009 ACM workshop on Cloud computing security, 127-134 (2009).
Zhao et al., "A message ferrying approach for data delivery in sparse mobile ad hoc networks," Proceedings of the 5th ACM international symposium on Mobile ad hoc networking and computing, 187-198 (2004).
Zhao et al., "VADD: Vehicle-assisted data delivery in vehicular ad hoc networks," IEEE Transactions on Vehicular Technology, 57(3): 1910-1922 (2008).
Zhou et al, "Efficient Privacy-Preserving Ciphertext-Policy Attribute Based Encryption and Broadcast Encryption," Oct. 8, 2013, *IEEE*, 126-138.
Zhou and Huang, "An optimal key distribution scheme for multicast group communication," IEEE Conference on Computer Communications (Infocom), 5 pages, (2010).
Zhou and Huang, "Constructing Efficient Attribute-Based Broadcast Encryption," IEEE Infocom, 2 pages, 2010.
Zhou and Huang, "On Efficient Ciphertext-Policy Attribute Based Encryption and Broadcast Encryption," 17th ACM Conference on Computer and Communications Security (2010), 19 pages.
Zhou et al., "Efficient Privacy-Preserving Ciphertext-Policy Attribute Based Encryption and Broadcast Encryption," AsiaCCS, 18 pages, (2011).
Zhou et al., "Enforcing User-Controlled Secure Data Sharing for Public Cloud Data Services," Arizona State University, 9 pages, (year unknown).
Zhou, Z: "On Efficient and Scalable Attribute Based Security Systems," Dissertation, Arizona State University, May 2011.
Zhu et al., "Comparison-based encryption for fine-grained access control in clouds," in Proceedings of the second ACM conference on Data and Application Security and Privacy. *ACM*, pp. 105-116, 2012.
Zhu et al., "Towards temporal access control in cloud computing." *INFOCOM*, 2012.
Zou et al., "A Practical and Flexible Key Management Mechanism for Trusted Collaborative Computing," INFOCOM 2008, 27th Conference on Computer Communications, 538-546 (2008).

* cited by examiner

ENABLING COMPARABLE DATA ACCESS CONTROL FOR LIGHTWEIGHT MOBILE DEVICES IN CLOUDS

CROSS-REFERENCE TO RELATED APPLICATIONS

This patent application is a divisional of U.S. application Ser. No. 14/216,332, filed Mar. 17, 2014, which claims priority to U.S. Provisional Application No. 61/788,552, filed Mar. 15, 2013, all of which are incorporated by reference in their entireties without disclaimer.

This application is related to U.S. application Ser. No. 14/216,202, filed Mar. 17, 2014, the entire disclosure of which is hereby incorporated by reference.

STATEMENT REGARDING FEDERALLY SPONSORED RESEARCH OR DEVELOPMENT

This invention was made with government support under Grant No. N000014-10-1-0714 awarded by The Office of Naval Research (Navy/ONR). The government has certain rights in the invention.

BACKGROUND

1. Field of the Invention

The present invention relates generally to encryption. More particularly, it relates to Ciphertext Policy Attribute Based Encryption (CP-ABE).

2. Description of Related Art

Data access control has been an increasing concern in the cloud environment where cloud users can compute, store and share their data. Cloud computing provides a scalable, location-independent and high-performance solution by delegating computation tasks and storage into the resource-rich clouds. This overcomes the resource limitation of users with respect to data storage, data sharing and computation; especially when it comes to mobile devices considering their limitations of processing hardware, storage space, and battery life. However, in reality, the cloud is usually not fully trusted by data owners; moreover, the cloud service providers may be tempted to peek at users' sensitive data and produce trapdoors in computation for commercial interests. To enforce secure data access control on untrusted cloud servers, traditional methods (e.g., AES) encrypt data before storing it in the cloud, but they incur high key-management overhead to provide dynamic group-based access control and significantly increases the system complexity.

Ciphertext-Policy Attribute-Based Encryption (CP-ABE) has been proposed to provide a fine-grained access control for dynamic group formation in cloud-based data storage solutions. It enables the data owners to create access policies by designating attribute constraints and embedding the data access policies into the ciphertext, such that any data user has to satisfy the corresponding attributes to access the data. CP-ABE is designed to handle descriptive attributes, and it needs to convert comparative attributes into a bit-wise monotone access tree structure to enforce expressive access control of encrypted data. New methods for outsourcing decryption of ABE ciphertexts with significantly reduced decryption cost were devised, but their encryption cost grows with the number of involved attributes, and bitwise comparison has to be adopted for comparison.

Generally speaking, most existing CP-ABE schemes suffer several drawbacks. One drawback is that they require intensive computation to set up an access tree structure and perform subsequent encryption or decryption conforming to the tree structure. Hence, they are unsuitable for computation-constrained mobile devices.

Another drawback is that most existing CP-ABE schemes perform cryptographic comparison operations (such as $\leq$ and $\geq$) by following a series of bit-wise equal matching (e.g., 10*11*01) in a hierarchical tree structure, which involves a substantial amount of computational cost.

Another drawback is that most existing CP-ABE schemes do not support effective range comparisons (e.g., $2 \leq hours \leq 4$, $3 \leq level \leq 5$). In fact, an attribute could have a collection of possible values in a sequential partial order. In other words, certain attributes may take the form of range values. For example, a healthy adult's resting heart rate may range from 60 to 100 beats per minute. Another example is that New York State residents with the income from $8,001 to $11,000 may be subject to 4.5% tax rates.

Additionally, most existing ABE schemes rely on bitwise-comparison operators with AND/OR gates and they cannot effectively support dual comparative expressions. Besides, the computational cost they bring overwhelms resource-limited mobile devices. One existing ABE scheme introduced an integer comparison mechanism to fine-grained access control based on attribute range. The same scheme is used to apply temporal access control and role-based control. However, the encryption cost involved is still too heavy for resource-constrained data owners, and the size of users' private keys and ciphertext overhead grows linearly with the number of attributes. Moreover, it has not considered negative attributes and wildcards.

Additionally, multi-authority ABE starts to attract attention as multiple attributes authorities are required to operate independently in many application scenarios. One existing multi-authority ABE requires a central trusted party to issue the key to every user. An improved version removes the central authority, and requires all the attribute authorities to cooperate in the access control. Other multi-authority ABE schemes require a centralized authority to create the master key and accordingly generate keys to each user. Multi-authority ABE schemes have been developed in which no preset access structure exists and the key generation authorities can work independently from each other. In the meantime, the privacy of access policy is a concern in attribute-based encryption. Certain multi-authority ABE schemes have been proposed to ensure the recipient gets no information of the policy if the decryption fails after a complete computation-intensive process with a central authority.

SUMMARY

This disclosure includes embodiments of Ciphertext Policy Attribute Based Encryption (CP-ABE) systems. To address the issues stated above, the embodiments may support both negative attributes and wildcards along with various range relationships over different attributes. The embodiments may ensure the sizes of key and ciphertext overhead remain constant regardless of the number of attributes. In the disclosed embodiments, encryption and decryption overhead over data owners and data users may also stay constant irrespective of the number of attributes.

The disclosed embodiments further may enable data owners to label attribute domains with different levels of confidentiality in the access policy while the attribute authorities can operate independently. In the disclosed embodiments, the policy over each attribute domain may be revealed only if the data owners' attribute ranges can satisfy the policy over the less confidential attribute domains in Extended Ciphertext Policy Attribute Based Encryption (ECCP-CABE) systems. ECCP-CABE achieves efficiency at the cost of less flexible attribute structure compared to various multi-authority ABE schemes. In addition, ECCP-CABE provides policy exposure at the attribute domain level and performs encryption and decryption over each attribute domain in a batch-processing manner.

Some embodiments of the present disclosure comprise a method of storing encrypted data in a computer based processing system. In some embodiments, the method comprises generating a public key PK and a master key MK. In some embodiments, the method comprises publishing said public key PK and issuing private keys $SK_{LU}$ and public keys $PK_{LU}$ to each data user. In some embodiments, said public and private keys are based on the data user's ID and attribute range $L_U$. In some embodiments, the method comprises receiving a request for a partially encrypted header from a data owner. In some embodiments, said request includes a specified access control policy Ps.

In some embodiments, the method comprises generating a partially encrypted header $\tilde{H}$ based on the public key PK, the master key MK, and the specified access control policy Ps. In some embodiments, the method comprises transmitting said partially encrypted header $\tilde{H}$ to said data owner. In some embodiments, the method comprises receiving a header H and encrypted data from said data owner. In some embodiments, said header H and encrypted data are based at least in part on said partially encrypted header $\tilde{H}$.

In some embodiments, the access control policy Ps may be a non-hierarchical structure. In some embodiments, it can apply different range relationships on different attributes i) intersection: $[t_i, t_j] \cap [t_a, t_b] \neq \emptyset$ ii) contained: $[t_i, t_j] \subseteq [t_a, t_b]$ iii) containing: $[t_i, t_j] \supseteq [t_a, t_b]$). In some embodiments, the second and the third range relationships may be the special cases of the intersection relationship, so the techniques used in the intersection range relationship can also be used for the following two range relationships.

In some embodiments, the method may further comprise receiving a request from a user for access to encrypted data, partially decrypting said header H based on the user's public key $PK_{LU}$, privilege LU and access control policy Ps, and sending the partially decrypted header $\tilde{H}$ to the user.

In some embodiments, multi-dimensional forward/backward derivative functions may be used to compare a data user's attribute range LU to a specified access control policy Ps.

In some embodiments, the step of generating a public key PK and a master key MK may be performed in accordance with the following algorithm:
1) selects two generators G, W ∈ $\mathbb{G}$;
2) randomly chooses $\lambda \in \mathbb{Z}_n^*$ and computes $T = \lambda W \in \mathbb{G}$;
3) selects a random $\alpha \in \mathbb{Z}_n^*$ and computes $e(G, W)^\alpha$;
4) selects random $\vec{\pi}, \overleftarrow{\pi} \in \mathbb{Z}_n^*$;
5) publishes PK={$\mathbb{S}$, T, W, h(•), e(G, W)$^\alpha$ as public key, keep master key MK={$\lambda$, $\alpha$, G, $\vec{\pi}$, $\overleftarrow{\pi}$ } as secret.

In some embodiments, the step of issuing private keys $SK_{LU}$ and public keys $PK_{LU}$ to each data user, said public and private keys based on the data user's ID and attribute range $L_U$, may be performed in accordance with the following algorithm:

KeyGen (MK, u, $\mathcal{L}_u$) → ($SK_{\mathcal{L}_u}$, $PK_{\mathcal{L}_u}$): Given a user u's attribute ranges $\mathcal{L}_u = \{[v_{i,a}, v_{i,b}]\}_{1 \leq i \leq m}$, this algorithm outputs u's public key $PK_{\mathcal{L}_u} = \{\vec{\psi}_U, \overleftarrow{\psi}_U\}$ and u's private key $SK_{\mathcal{L}_u} = \{A_u, \vec{A}_u, \overleftarrow{A}_u\}$. Each part of $PK_{\mathcal{L}_u}$ and $SK_{\mathcal{L}_u}$ are generated as follows:

1) computes $\{\vec{w}_{i,a} = \Pi_{0 \leq \xi \leq a}(h(v_{i,\xi}))\}_{1 \leq i \leq m}$ and $\{\overleftarrow{w}_{i,b} = \Pi_{b \leq \xi \leq n_i}(h(v_{i,\xi}))\}_{1 \leq i \leq m}$;
2) computes the first part and second part of public key $PK_{\mathcal{L}_u}$: $\vec{\psi}_U = \vec{\pi}^{\vec{w}_U} = \vec{\pi}^{\Pi_{1 \leq i \leq m} \vec{w}_{i,a}}$, $\overleftarrow{\psi}_U = \overleftarrow{\pi}^{\overleftarrow{w}_U} = \overleftarrow{\pi}^{\Pi_{1 \leq i \leq m} \overleftarrow{w}_{i,b}}$;

3) chooses a random $\gamma_u \in \mathbb{Z}_N^*$ for each user u and computes the first part of private key $SK_{\mathcal{L}_u}$: $A_u = (\gamma_u + \alpha)G \in \mathbb{G}$;
4) computes the second part and third part of private key $$SK_{\mathcal{L}_u}: \vec{A}_u = \frac{\gamma_u}{\lambda \vec{\psi}_U + 1} G \in \mathbb{G} \text{ and } \overleftarrow{A}_u = \frac{\gamma_u}{\lambda \overleftarrow{\psi}_U 1} G \in \mathbb{G};$$

In some embodiments, the step of generating a partially encrypted header $\tilde{H}$ may be performed in accordance with the following algorithm.

EncDelegate(PK, MK, $\mathcal{P}_s$) → H: Given public key PK, master key MK and the designated access control policy of attribute range $\mathcal{P}_s = \{[v_{i,j}, v_{i,k}]\}_{1 \leq i \leq m}$, this algorithm outputs the partially encrypted header $\tilde{H} = \{\vec{\psi}_s, \overleftarrow{\psi}_s\}$ by the steps below:

1) computes $\{\vec{w}_{i,k} = \Pi_{0 \leq \xi \leq k}(h(v_{i,\xi}))\}_{1 \leq i \leq m}$ and $\{\overleftarrow{w}_{i,j} = \Pi_{j \leq \xi \leq n_i}(h(v_{i,\xi}))\}_{1 \leq i \leq m}$;
2) computes $\vec{w}_s = \Pi_{1 \leq i \leq m} \vec{w}_{i,k}$ and $\overleftarrow{w}_s = \Pi_{1 \leq i \leq m} \overleftarrow{w}_{i,j}$;
3) computes the first part of partially encrypted header $\vec{\psi}_s = \vec{\pi}^{\vec{w}_s} = \vec{\pi}^{\Pi_{1 \leq i \leq m} \vec{w}_{i,k}}$ and the second part of partially encrypted header $\overleftarrow{\psi}_s = \overleftarrow{\pi}^{\overleftarrow{w}_s} = \overleftarrow{\pi}^{\Pi_{1 \leq i \leq m} \overleftarrow{w}_{i,j}}$;

In some embodiments, a method for encrypting data in a computer based processing system using a trust authority with a public key PK and a master key MK, comprises sending a request for a partially encrypted header $\tilde{H}$ to the trust authority with a specified access control policy Ps. In some embodiments, the method comprises receiving a partially encrypted header computed by the trust authority, said partially encrypted header $\tilde{H}$ being based on the public key PK, the master key MK, and the specified access control policy Ps. In some embodiments, the method comprises encrypting data using the partially encrypted header $\tilde{H}$.

In some embodiments, the step of encrypting data may comprise generating a session key Ks and ciphertext H using the partially encrypted header $\tilde{H}$.

In some embodiments, the data may be encrypted according to the following algorithm:

Encrypt($\tilde{H}$) → (H, $K_s$): Given the partially encrypted header, this algorithm produces the session key $K_s$ and ciphertext H={$\mathcal{P}_s$, C, $E_{\vec{s}}$, $E_s$, $\hat{E}_{\vec{s}}$, $\hat{E}_s$} to cloud storage. Each part of H is generated as follows:
1) randomly chooses two secret $s_1, s_2 \in \mathbb{Z}_n$;
2) computes the main secret $s = s_1 + s_2 \in \mathbb{Z}_n$ and derives C = sW ∈ $\mathbb{G}$;

3) produces the session key $K_s = e(G,W)^{\alpha s}$ and uses $K_s$ to encrypt data.

4) computes $E_{\vec{s}} = s_1 T$ and $E_{\underline{s}} = s_2 T$;

5) computes $\hat{E}_{\vec{s}} = s_1 \vec{\psi}_{\vec{s}} T \cdot s_1 W = s_1 \vec{\psi}_{\vec{s}} \lambda W \cdot s_1 W = s_1 (\lambda \vec{\psi}_{\vec{s}} + 1)W$ W and $\hat{E}_{\underline{s}} = s_2 \overline{\psi}_{\underline{s}} T \cdot s_2 W = s_2 \overline{\psi}_{\underline{s}} \lambda W \cdot s_2 W = s_2 (\lambda \overline{\psi}_{\underline{s}} + 1)W$.

In some embodiments, the computer based processing system may be a cloud storage system.

In some embodiments, a method of decrypting data which has been stored in a computer based processing system in accordance with the previously described method of comprises receiving a request for access to data. In some embodiments, said request includes a user identity. In some embodiments, the method further comprises partially decrypting an encrypted header H if said user is entitled to access said data based on the user's public key $PK_{L_U}$, privilege $L_U$ and access control policy Ps. In some embodiments, the method comprises sending the partially decrypted header $\tilde{H}$ to said user.

In some embodiments, the step of partially decrypting the header H may be performed in accordance with the following algorithm:

DecDelegate(H, $PK_{\mathcal{L}_u}$, $\mathcal{L}_u$, $\mathcal{P}_s$)→$\hat{H}$: Given a user's public key $PK_{\mathcal{L}_u}$ and privilege $\mathcal{L}_u$ along with the data owner's access control policy $\mathcal{P}_s$, the algorithm should output $\vec{\psi}_{\vec{s}}$ and $\overline{\psi}_{\underline{s}}$ only if $[v_{i,j}, v_{i,k}] \cap [v_{i,a}, v_{i,b}] \neq \emptyset$ for all $A_i \in \mathbb{A}$:

$$\vec{F}_{U \preceq \vec{S}}(\vec{\psi}_U) = (\vec{\psi}_U)^{\overline{w}_{U,\vec{s}}}$$

$$= (\vec{\pi}^{\prod_{1 \leq i \leq m} \overline{w}_{i,a}})^{\prod_{1 \leq i \leq m}(\overline{w}_{i,(a,k)})} = \vec{\psi}_{\vec{s}} (\text{mod } n)$$

$$\overline{F}_{\underline{S} \preceq \overline{U}}(\overline{\psi}_{\overline{U}}) = (\overline{\psi}_{\overline{U}})^{\overline{w}_{\underline{s},\overline{U}}}$$

$$= (\overline{\pi}^{\prod_{1 \leq i \leq m} \overline{w}_{i,b}})^{\prod_{1 \leq i \leq m}(\overline{w}_{i,(j,b)})} = \overline{\psi}_{\underline{s}} (\text{mod } n)$$

where $\vec{w}_{U,\vec{s}} = \Pi_{1 \leq i \leq m}(\overline{w}_{i,(a,k)})$ and $\overline{w}_{\underline{s},\overline{U}} = \Pi_{1 \leq i \leq m}(\overline{w}_{i,(j,b)})$.

Then it outputs $\hat{H} = \{H, \vec{\psi}_U - \vec{\psi}_{\vec{s}}, \overline{\psi}_{\overline{U}} - \overline{\psi}_{\underline{s}}\}$ as partially decrypted header.

In some embodiments, the method may further comprise retrieving a session key Ks with the following algorithm and decrypting data utilizing the session key Ks.

Decrypt($\widetilde{SK}_{\mathcal{L}_t}$, $\hat{H}$)→$K_s$: Given the delegation key $\widetilde{SK}_{\mathcal{L}_t}$ and header $\hat{H}$, this algorithm perform the following computation:

$$\Gamma(s_1) = e(\vec{A}_u, \hat{E}_{\vec{S}} \cdot (\vec{\psi}_U - \vec{\psi}_S)E_{\vec{S}})$$

$$= e(\vec{A}_u, s_1(\lambda \vec{\psi}_{\vec{S}} + 1)W \cdot (\vec{\psi}_U - \vec{\psi}_{\vec{S}})s_1 \lambda W)$$

$$= e(\vec{A}_u, s_1(\lambda \vec{\psi}_{\vec{S}} + 1 + \lambda \vec{\psi}_U - \lambda \vec{\psi}_{\vec{S}})W)$$

$$= e\left(\frac{\gamma_u}{\lambda \vec{\varphi}_U + 1} G, s_1(\lambda \vec{\psi}_U + 1)W\right)$$

$$= e(G, W)^{\frac{\gamma_u}{\lambda \vec{\psi}_U + 1} \cdot s_1(\lambda \vec{\psi}_U + 1)}$$

$$= e(G, W)^{\gamma_u s_1}$$

-continued $$\Gamma(s_2) = e(\vec{A}_u, \hat{E}_{\underline{S}} \cdot (\overline{\psi}_{\overline{U}} - \overline{\psi}_{\underline{S}})E_{\underline{S}})$$

$$= e(\vec{A}_u, s_2(\lambda \overline{\psi}_{\underline{S}} + 1)W \cdot (\overline{\psi}_{\overline{U}} - \overline{\psi}_{\underline{S}})s_2 \lambda W)$$

$$= e(\vec{A}_u, s_2(\lambda \overline{\psi}_{\underline{S}} + 1 + \lambda \overline{\psi}_{\overline{U}} - \lambda \overline{\psi}_{\underline{S}})W)$$

$$= e\left(\frac{\gamma_u}{\lambda \overline{\varphi}_{\overline{U}} + 1} G, s_2(\lambda \overline{\psi}_{\overline{U}} + 1)W\right)$$

$$= e(G, W)^{\frac{\gamma_u}{\lambda \overline{\psi}_{\overline{U}} + 1} \cdot s_2(\lambda \overline{\psi}_{\overline{U}} + 1)}$$

$$= e(G, W)^{\gamma_u s_2}$$

It can derive $I = \Gamma(s_1) \cdot \Gamma(s_2) = e(G, W)^{\gamma_u s}$.

In some embodiments, the method may be performed at least partially in a cloud storage system.

In some embodiments, a non-transitory computer readable medium stores a program causing a computer to execute a process in accordance with any of the foregoing methods.

In some embodiments, an encryption device comprises a processor, and a memory coupled to said processor, wherein said processor is configured with logic to execute a process in accordance with any one of the foregoing methods.

In some embodiments, a cloud storage system comprises a cloud resource, said cloud resource comprising a processor configured with logic to execute a process in accordance with any one of the foregoing methods.

DESCRIPTION OF ILLUSTRATIVE EMBODIMENTS

Figure 1:
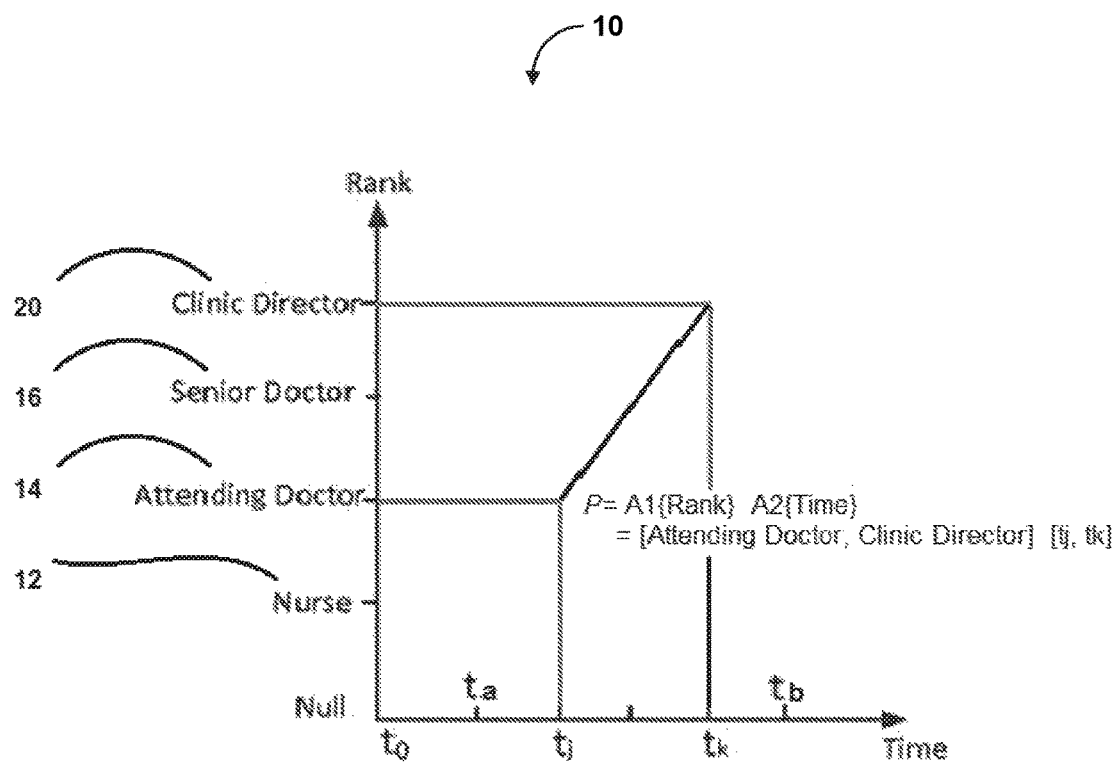
FIG. 1 depicts an exemplary embodiment that illustrates two-dimensional attribute ranges in an example of the disclosed CCP-CABE scheme.

In the following detailed description, reference is made to the accompanying drawings, in which are shown exemplary but non-limiting and non-exhaustive embodiments of the invention. These embodiments are described in sufficient detail to enable those having skill in the art to practice the invention, and it is understood that other embodiments may be used, and other changes may be made, without departing from the spirit or scope of the invention. The following detailed description is, therefore, not to be taken in a limiting sense, and the scope of the invention is defined only by the appended claims. In the accompanying drawings, like reference numerals refer to like parts throughout the various figures unless otherwise specified.

A new comparative attribute-based encryption scheme, namely Constant-size Ciphertext Policy Comparative Attribute Based Encryption (CCP-CABE) is disclosed. FIG. 1 discloses an exemplary embodiment graph 10 used to illustrate how the encryption scheme works in a real-world scenario (e.g., telemedicine). In the embodiment shown, a patient periodically uploads his/her health records to a medical information service delivered by a cloud provider, and healthcare professionals in the designated clinic can monitor his/her health status based on his/her health records. In the embodiment shown, this patient has a policy that only healthcare professionals with positions higher than Nurse 12 can access his/her health info between time $t_j$ and $t_k$. Thus, the data access can be specified by a policy $P=[A_1 \wedge A_2]$, where $A_1$=rank and $A_2$=time are two attributes, and each attribute has a certain range, where Rank={Nurse 12, Attending Doctor 14, Senior Doctor 16, Clinic Director 18} and Time={$t_x|x \in Z$} In the embodiment shown, correspondingly, a Senior Doctor who has a higher rank can access the data if he/she has been authorized to the time interval that is contained in $[t_j, t_k]$.

The proposed CCP-CABE integrates all attribute ranges as a single encryption parameter and compares data users' attribute ranges against attribute constraints of an access policy designated by the data owner through Multi-dimensional Range Derivation Function (MRDF). Consequently, the communication overhead is substantially reduced, as the packet size is constant regardless of the number of attributes. Furthermore, intensive encryption and decryption operations are delegated to a mobile cloud. As a result, the computation cost of resource-limited data owners and data users remains minimal. These features make the CCP-CABE approach suitable for data sensing and retrieval services running on lightweight mobile devices or sensors. In certain embodiments, an extended CCP-CABE is provided to satisfy the application requirement that data owners need to share data with a policy written over attributes issued across various attribute domains. Both schemes may be secure against various attacks, preventing honest-but-curious cloud service owners from decrypting ciphertext and countering key collusion attacks from multiple data owners and users.

In certain embodiments, CCP-CABE is a new comparative attribute-based encryption scheme to provide efficient and secure access control in a cloud environment. It leverages MRDF to compare data users' attribute ranges against attribute constraints designated by the data owner.

In certain embodiments, CCP-CABE can predefine different range intersection relationships on different attributes. It also incorporates wildcards and negative attributes so it can handle more expressive types of access control.

In certain embodiments, CCP-CABE minimizes the communication overhead to constant size regardless of the number of attributes and comparison ranges. It also minimizes the computation overhead on resource-constrained data owners and data users irrespective of the number of attributes due to secure computation delegation. Evaluation results show that the computation overhead of mobile devices remains small and constant irrespective of the associated attributes and comparison ranges.

In certain embodiments, CCP-CABE enforces access control over multiple independent attribute domains. An encrypted access policy prioritizes the level of confidentiality of different attribute domains, and data users can only start decryption from the least confidential domain to the most confidential one to help protect the privacy of the access policies. Communication and computation overhead only grows with the number of trust authorities rather than the number of attributes.

In certain embodiments, CCP-CABE can predefine different range relationships on different attributes (e.g., $[t_i, t_j] \cap [t_a, t_b] \neq \emptyset$, $[t_i, t_j] \subseteq [t_a, t_b]$, $[t_i, t_j] \supseteq [t_a, t_b]$). It also can incorporate wildcards and negative attributes, and so it can handle more expressive types of encrypted access control.

CCP-CABE System Overview, Preliminaries, and Security Model

Figure 2:
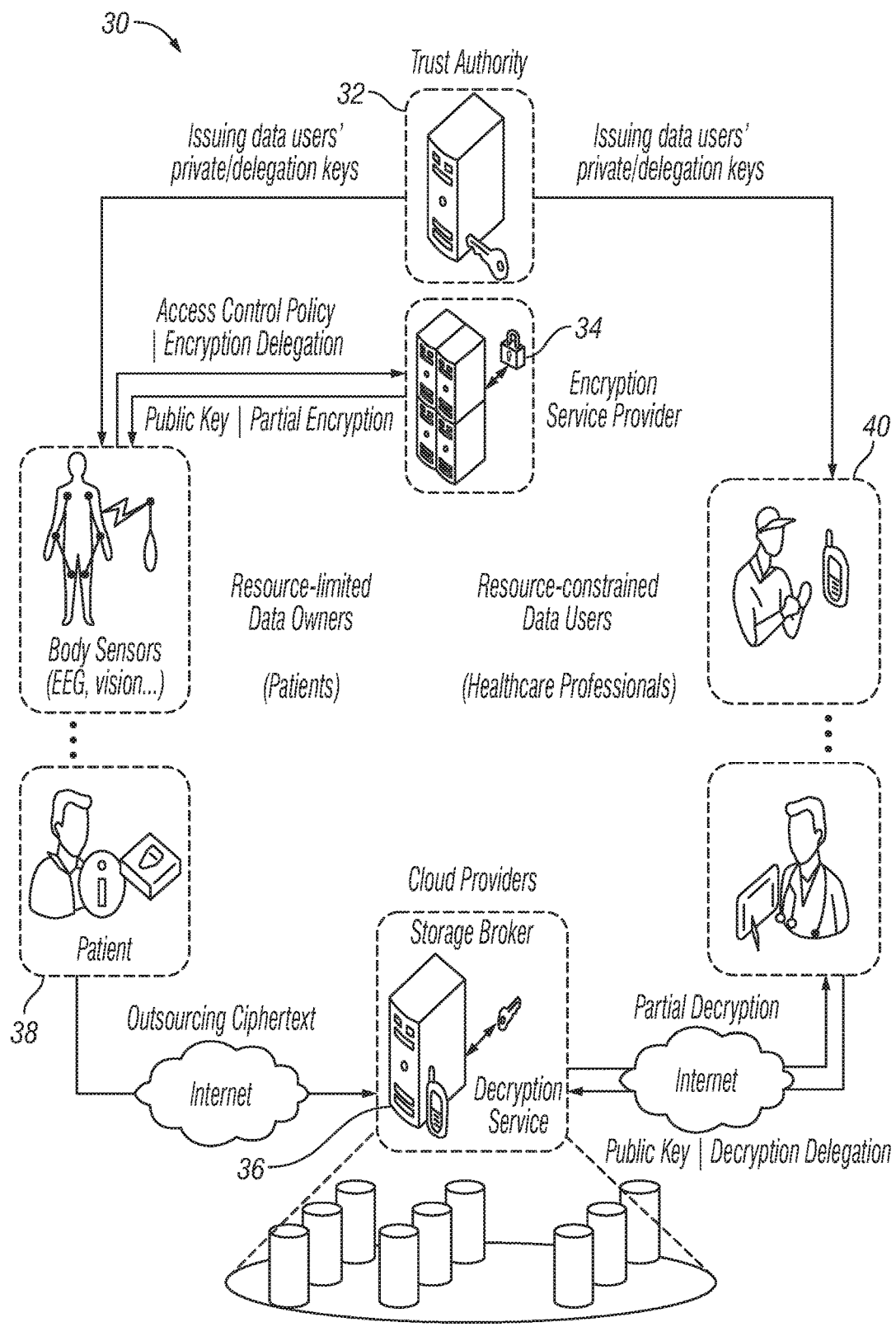
FIG. 2 depicts an exemplary embodiment that illustrates an architecture of a CCP-CABE framework with a central trust authority.

FIG. 2 discloses an exemplary embodiment of a CCP-CABE application framework 30. A CCP-CABE framework may comprise a central Trust Authority (TA) 32, e.g., a government health agency) a trusted Encryption Service Provider 34, a Cloud Provider 36, data owners 38 (e.g., patients) and data users 40 (e.g., healthcare professionals). The framework may further comprise In the telemedicine example of FIG. 1, the patients may have resource-limited biometric devices, and they may need to distribute the sensitive Electronic Health Records (EHRs) to different storage servers hosted by cloud providers for healthcare professionals in remote places to review. In the embodiment shown, the patients can specify different access policies with respect to healthcare professionals' attribute ranges (e.g., positions, length of service). To protect the patients' privacy, the government health agency may issue keys to both patients and healthcare professionals for EHR encryption and decryption. Hence, in certain embodiments, the patients can embed their access policies into the health data with the keys, and only the eligible healthcare professionals can decrypt corresponding EHRs with their delegation/private keys based on their own attribute ranges.

A definition of attribute range and problem formulation will now be provided. In Table 1, commonly used symbols in CCP-CABE are listed for reference. Certain comparison operations are shown as below:

TABLE 1

Notations for CCP-CABE

| Notation | Description |
| --- | --- |
| $\mathbb{A}, A_i$ | the whole attribute set and its i-th attribute |
| m | the number of attributes in $\mathbb{A}$ |
| $n_i$ | the maximum number of attribute values in $A_i$ |
| P | the data owner's access control policy |
| $\mathcal{L}_u$ | the data user u's attribute ranges |
| R, R', R⁻, R* | four different attribute range relationships |
| $t_{i, 0}$ | the dummy attribute value assigned to a user if he/she does not possess attribute $A_i$ |
| $t_{i, n_i}$ | the maximum attribute value in $A_i$ |
| $[t_{i, a}, t_{i, b}]$ | the attribute range on attribute $A_i$ possessed by a data user |
| $[t_{i, j}, t_{i, k}]$ | the range constraint on attribute $A_i$ defined by P |
| $\rho_i, \bar{\rho}_i$ | the bound values associated with $[t_{i, j}, t_{i, k}]$; it depends on the range relation over $A_i$ |
| F: V → V | Multi-dimensional Range Derivation Function (MRDF) |

In certain embodiments, $\mathbb{A}=\{A_1 \ldots {}^o, A_m\}$ can be a finite set of attributes, and each attribute $A_1 \in \mathbb{A}$ can contain a set of attribute values comprising discrete integer values, where $T_i=\{t_{i,1}, t_{i,2}, \ldots, t_{i,n_i}\}$ can be a number of integer values for attribute $A_1$. Without loss of generality, it can be assumed that all elements in $T_i$ are in ascending order such that $0 \leq t_{i,1} \leq t_{i,2} \leq \ldots \leq t_{i,n_i} \leq Z$ where Z is the maximum integer.

In certain embodiments, $t_{A_i}(t_{i,j}, t_{i,k})$ can represent a range constraint of attribute $A_i$ on $[t_{i,j}, t_{i,k}]$ where $1 \leq j \leq k \leq n_i$, i.e., $t_{i,j} \leq t_{A_i} \leq t_{i,k}$.

In certain embodiments, $P = \{\wedge t_{A_i} | \forall A_i \in \mathbb{A}, t_{i,j} \leq t_{A_i} \leq t_{i,k}\}$ where $1 \leq j \leq k \leq n_i$ can be a policy defined by a data owner over the set of attributes $\mathbb{A}$ and it can be expressed as a series of AND operations.

In certain embodiments, $\mathcal{L}_u = \{\wedge t_{A_i} | \forall A_i \in \mathbb{A}, t_{i,a} \leq t_{A_i} \leq t_{i,b}\}$ where $1 \leq a \leq b \leq n_i$ can define the attribute ranges possessed by a data user u over the set of attributes $\mathbb{A}$.

Figure 3:
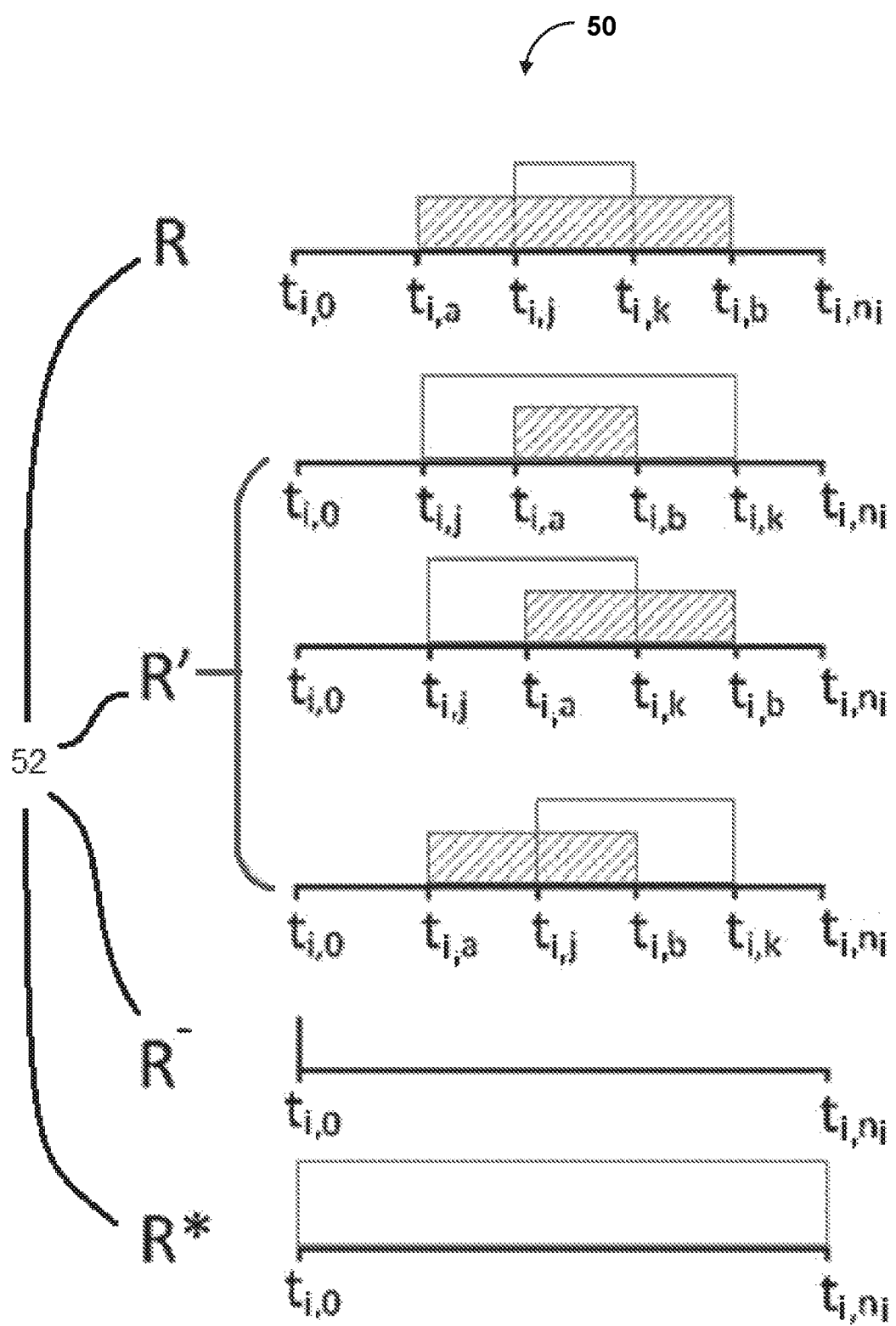
FIG. 3 depicts an exemplary embodiment that illustrates exemplary attribute range relations used in the disclosed CCP-CABE scheme.

FIG. 3 depicts an exemplary embodiment 50 that illustrates exemplary attribute range relations used in the disclosed CCP-CABE scheme. As illustrated in FIG. 3. a data owner can apply any one of the following attribute range relations 52 $\{R, R', R^-R^*\}$ over each attribute $A_i$, such that the data user u's attribute ranges $\mathcal{L}_u$ can satisfy the designated attribute range relations over all the attributes to access the resources. In certain embodiments, R can imply that the attribute ranges $\mathcal{L}_u$ should completely satisfy P on $A_i$, and it holds if $([t_{i,j}, t_{i,k}]\setminus[t_{i,a}, t_{i,b}]=\emptyset) \wedge ([t_{i,j}, t_{i,k}] \cap [t_{i,a}, t_{i,b}] \neq \emptyset)$. On the contrary, R' can imply that the attribute ranges $\mathcal{L}_u$ only need to partially satisfy P on $A_i$, and it holds if $([t_{i,j}, t_{i,k}]\setminus[t_{i,a}, t_{i,b}] \neq \emptyset) \wedge ([t_{i,j}, t_{i,k}] \cap [t_{i,a}, t_{i,b}] \neq \emptyset)$.

In addition, in certain embodiments, $R^-$ may imply that access control policy P may designate that an eligible data user must not own attribute $A_i$, which is classified as a negative attribute. In certain embodiments, if the data user u does not own attribute $A_i$, he/she may be assigned a dummy integer value $t_{i,0}$, distinct from the other attribute integer values, such that $t_{i,a} = t_{i,b} = t_{i,0}$, and the system places $t_{i,0}$ ahead of $t_{i,1}$ to derive $\{t_{i,0}, t_{i,1}, \ldots, t_{i,n_i}\}$ in order to follow the ascending order. Accordingly, in certain embodiments, there may exist $t_{i,j} = t_{i,k} = t_{i,0}$ in access control policy P. Consequently, $R^-$ may be satisfied if and only if $[t_{i,j}, t_{i,k}] = [t_{i,a}, t_{i,b}] = \{t_{i,0}\}$ holds.

Furthermore, in certain embodiments, $R^*$ may implicate that the data owner does not care about attribute $A_i$. In certain embodiments, $t_{i,j} = t_{i,0}$ and $t_{i,k} = t_{i,n_i}$ exist. This attribute may be classified as a wildcard. In certain embodiments, if the data owner specifies $A_i$ as a wildcard, then $[t_{i,j}, t_{i,k}]$ can become $[t_{i,0}, t_{i,n_i}]$ and it may hold the data user u's attribute range on $A_i$. In certain embodiments, it may imply that $([t_{i,j}, t_{i,k}] \cap [t_{i,a}, t_{i,b}] \neq \emptyset$ always holds if $[t_{i,a}, t_{i,b}] \neq \emptyset$. In this manner, CCP-CABE may be extended to be a comprehensive scheme to handle different range relations.

In certain embodiments, the CCP-CABE system is based on a composite order bilinear map group system $\mathbb{S}_N = (N=pq, \mathbb{G}, \mathbb{G}_T, e)$ where $N=pq$ is an RSA modulus and p and q are two large primes. $\mathbb{G}$ and $\mathbb{G}_T$ may comprise two cyclic groups with composite order n, where $n = sn' = s_1 s_2 p'q'$ and p, q, p', q', $s_1$, $s_2$ are all secret large primes. e denotes a computable bilinear map $e: \mathbb{G} \times \mathbb{G} \to \mathbb{G}_T$. The map has bilinearity $\forall g, h \in \mathbb{G}, \forall a, b \in \mathbb{Z}, e(g^a, h^b) = e(g, h)^{ab}$. The map also has non-degeneracy: g and h are the generators of $\mathbb{G}$, $e(g, h) \neq 1$. The map also has computability: $e(g, h)$ is efficiently computable.

In certain embodiments, $\mathbb{G}_s$ and $\mathbb{G}_{n'}$ may represent subgroups of order s and n' in $\mathbb{G}$ respectively, and $e(g, h)$ may become an identity element in $\mathbb{G}_T$ if $g \in \mathbb{G}_s, h \in \mathbb{G}_{n'}$. In one exemplary embodiment, w may be the generator of $\mathbb{G}$, $w^{n'}$ may be the generator of $\mathbb{G}_s$ and $w^s$ may be the generator of $\mathbb{G}_{n'}$. In certain embodiments, if it is assumed that $g = (w^{n'})\varrho_1$ and $h = (w^s)\varrho_2$ for some $\varrho_1, \varrho_2$, it holds that $e(g, h) = e(w\varrho_1, w\varrho_2)^{sn'} = 1$. In this manner, CCP-CABE may leverage the orthogonality between $\mathbb{G}_{n'}$ and $\mathbb{G}_s$ and keep N, n, s, p, q, p', q' secret.

In certain embodiments, a Multi-dimensional Range Derivation Functions (MRDF) is proposed. In certain embodiments, lower-bound and upper-bound integer values $t_{i,j}$, $t_{i,k}$ may be selected out of a possible attribute range over each attribute $A_i \in \mathbb{A}$, and derive the integer set $U = \{t_{i,j}, t_{i,k}\}_{A_i \in \mathbb{A}}$. In certain embodiments, to construct a cryptographic algorithm for range comparison over multiple dimensions (or attributes), order-preserving cryptographic map $\psi: U \to V$ may be defined for MRDF where V takes the form of $v_{\{t_{i,j}, t_{i,k}\}_{A_i \in \mathbb{A}}}$. In certain embodiments, $v_{\{t_{i,j}, t_{i,k}\}_{A_i \in \mathbb{A}}}$ is a cryptographic value reflecting the integer values of range bounds over each attribute $A_i \in \mathbb{A}$. In certain embodiments, the order-preserving cryptographic map $\psi$ implies that there exists $$v_{\{t_{i,j}, t_{i,k}\}_{A_i \in \mathbb{A}}} = \psi(\{t_{i,j}, t_{i,k}\}_{A_i \in \mathbb{A}}) \leq v_{\{t'_{i,j}, t_{i,k}\}_{A_i \in \mathbb{A}}} = \psi(\{t'_{i,j}, t_{i,k}\}_{A_i \in \mathbb{A}}) \text{ and } v_{\{t_{i,j}, t_{i,k}\}_{A_i \in \mathbb{A}}} = \psi(\{t_{i,j}, t_{i,k}\}_{A_i \in \mathbb{A}}) \leq v_{\{t_{i,j}, t'_{i,k}\}_{A_i \in \mathbb{A}}} = \psi(\{t_{i,j}, t'_{i,k}\}_{A_i \in \mathbb{A}})$$

if $t_{i,j} \leq t'_{i,j}$ and $t_{i,k} \leq t'_{i,k}$ hold for each $A_i \in \mathbb{A}$, where $\leq$ denotes the partial-order relations.

In certain embodiments, to construct a cryptographic MRDF for integer comparisons over multiple attributes, a multiplicative group $\mathbb{G}_{n'}$ of RSA-type composite order $n' = p'q'$, is leveraged where p' and q' are two large primes. In certain embodiments, a random generator $\varphi$ is selected in the group $\mathbb{G}_{n'}$ where $\varphi^{n'} = 1$. Two sets $\{\lambda_i, \mu_i\}_{A_i \in \mathbb{A}}$ where $\lambda_i, \mu_i \in \mathbb{Z}_n^*$, may then be generated and each $\lambda_i, \mu_i$ is relatively prime to all the other elements in $\{\lambda_i, \mu_i\}_{A_i \in \mathbb{A}}$ with sufficiently large order for all $A_i \in \mathbb{A}$. Consequently, mapping function $\psi(\bullet)$ may be defined to map an integer set U into V as shown below:

$$v_{\{t_{i,j}, t_{i,k}\}_{A_i \in \mathbb{A}}} \leftarrow \psi(\{t_{i,j}, t_{i,k}\}_{A_i \in \mathbb{A}}) = \varphi^{\prod_{A_i \in \mathbb{A}} \lambda_i^{t_{i,j}} \mu_i^{Z - t_{i,k}}} \in \mathbb{G}_{n'}$$

In some embodiments, MRDF may be defined as a function $F: V \to V$ based on $\underline{U}$. This function may be defined as a multi-dimensional range derivation function if it satisfies the following two conditions:

1) the function F may be computed in polynomial time, i.e., if $t_{i,j} \leq t'_{i,j}, t_{i,k} \geq t'_{i,k}, \forall A_i \in \mathbb{A}$, then $$v_{\{t'_{i,j}, t'_{i,k}\}_{A_i \in \mathbb{A}}} \leftarrow F_{\{t_{i,j} \leq t'_{i,j}, t_{i,k} \geq t'_{i,k}\}_{A_i \in \mathbb{A}}}(v_{\{t_{i,j}, t_{i,k}\}_{A_i \in \mathbb{A}}}),$$

and 2) it is infeasible for any probabilistic polynomial time (PPT) algorithm to derive $v_{\{t'_{i,j}, t'_{i,k}\}_{A_i \in \mathbb{A}}}$ from $v_{\{t_{i,j}, t_{i,k}\}_{A_i \in \mathbb{A}}}$ if there exists $t_{i,j} > t'_{i,j}$ or $t_{i,k} > t'_{i,k}$ for some $A_i \in \mathbb{A}$.

Specifically, $F(\bullet)$ may take the form as follows:

$$v_{\{t'_{i,j}, t'_{i,k}\}_{A_i \in \mathbb{A}}} \leftarrow F_{\{t_{i,j} \leq t'_{i,j}, t_{i,k} \geq t'_{i,k}\}_{A_i \in \mathbb{A}}}(v_{\{t_{i,j}, t_{i,k}\}_{A_i \in \mathbb{A}}}) =$$

$$\left(v_{\{t_{i,j}, t_{i,k}\}_{A_i \in \mathbb{A}}}\right)^{\prod_{A_i \in \mathbb{A}} \lambda_i^{t'_{i,j} - t_{i,j}} \mu_i^{t_{i,k} - t'_{i,k}}} =$$

$$\left(\varphi^{\Pi_{A_i \in \mathbb{A}} \lambda_i^{t_{i,j}} \mu_i^{Z-t_{i,k}}}\right)^{\Pi_{A_i \in \mathbb{A}} \lambda_i^{t'_{i,j}-t_{i,j}} \mu_i^{t_{i,k}-t'_{i,k}}} = \varphi^{\Pi_{A_i \in \mathbb{A}} \lambda_i^{t'_{i,j}} \mu_i^{Z-t'_{i,k}}} \in \mathbb{G}_{n'}.$$

In some embodiments, ordering relationships among the integer values $t_{i,j}$, $t_{i,k}$, $t'_{i,j}$, $t'_{i,k}$ can be varied depending on the designated range relation $R_i$ over each attribute $A_i$. Furthermore, it may be infeasible to compute $\lambda_i^{-1}$ and $\mu_i^{-1}$ in polynomial time due to the secrecy of n' under the RSA assumption. In some embodiments, in addition, each $\lambda_i$ is relatively prime to all the other elements in $\{\lambda_i\}_{A_i \in \mathbb{A}}$, and each $\mu_i$ is also relatively prime to all the other elements in $\{\mu_i\} A_i \in \mathbb{A}$. Consequently, it may be infeasible to compute $v_{\{t_{i,j}\} A_i \in A}$ from $v_{\{t_{i,k}\} A_i \in A}$, or derive $\bar{v}_{\{t_{i,k}\} A_i \in A}$ from $\bar{v}_{\{t_{i,j}\} A_i \in A}$ if there exist $t_{i,j} \le t_{i,k}$ for some $A_i \in \mathbb{A}$.

In some embodiments, the CCP-CABE scheme may be comprised of six algorithms as discussed below.

In some embodiments, a Setup algorithm Setup($\kappa$, $\mathbb{A}$) takes input of the security parameter $\kappa$ and the attribute set $\mathbb{A}$. It may output the global parameters GP for encryption and the master key MK. In some embodiments, a central Trust Authority (TA) first chooses a bilinear map system $\mathbb{S}_{N} = (N=pq, \mathbb{G}, \mathbb{G}_T, e(\cdot,\cdot))$ of composite order n=sn' and two subgroups $\mathbb{G}_s$ and $\mathbb{G}_{n'}$ of $\mathbb{G}$. Next, the TA may select random generators $w \in \mathbb{G}$, $g \in \mathbb{G}_s$ and $\varphi$, $\bar{\varphi} \in \mathbb{G}_{n'}$ such that there exist $e(g, \varphi) = e(g, \bar{\varphi}) = 1$ but $e(g, w) \ne 1$. The TA may need to choose $\lambda_i$, $\mu_i \in \mathbb{Z}_n^*$, over each attribute $A_i \in \mathbb{A}$, and ensure that each $\lambda_i$, $\mu_i$ is relatively prime to all the other elements in $\{\lambda_i, \mu_i\} A_i \in \mathbb{A}$. The TA may also employ a cryptographic hash function H: $\{0,1\}^* \to \mathbb{G}$ to convert a binary attribute string into an group element $\in \mathbb{G}$. In addition, the TA may pick random exponents $\alpha$, $\beta \in \mathbb{Z}_n^*$n and generate $$h = w^\beta, \eta = g^{\frac{1}{\beta}}$$

and $e(g,w)^\alpha$. Consequently, the TA may keep its master key and publish the global parameters GP=($\mathbb{S}$, g, h, w, $\eta$, $e(g, w)^\alpha$, $\varphi$, $\{\lambda_i, \mu_i\} A_i \in \mathbb{A}$, H($\cdot$)).

In some embodiments, a KeyGen algorithm KeyGen(GP, MK, u, $\mathcal{L}_u$) takes input of global parameters GP, master key MK, data user u's ID and corresponding attribute ranges $\mathcal{L}_u$ as the input. It may output public keys $PK_u$ and private keys $SK_u$ for each data user. In some embodiments, each user u may be labeled with a set of attribute ranges $\mathcal{L}_u = \{[t_{i,a}, t_{i,b}]\}_{A_i C}$ with $t_{i,a} \le t_{i,b}$ over all attributes. If the user u does not possess the attribute $A_i$, then the TA may set $t_{i,a} = t_{i,b} = t_{i,0}$. The TA may select unique integers $\tau_u$, $r_u \in \mathbb{Z}$ to distinguish u from other users, and may concatenate binary string forms of all the attributes to derive $A = (A_1 \| A_2 \| \ldots A_m)$. Consequently, for each user u with attribute ranges $\mathcal{L}_u$, his/her private key $SK_u$ may be computed as $$SK_u = (D_0^{(u)}, D_1^{(u)}, D_2^{(u)}) = \left(g^{\frac{\alpha+\tau_u}{\beta}}, g^{\tau_u}(H(A))^{\tau_u}, w^{r_u}\right),$$

and his/her delegation key may be computed as $$DK_u = (v_{\mathcal{L}_u})^{r_u} = \varphi^{r_u \Pi_{A_i \in \mathbb{A}} \lambda_i^{t_{i,a}} \mu_i^{Z-t_{i,b}}},$$

where $$v_{\mathcal{L}_u} = v_{\{t_{i,a}, t_{i,b}\}_{A_i \in \mathbb{A}}} = \varphi^{r_u \Pi_{A_i \in \mathbb{A}} \lambda_i^{t_{i,a}} \mu_i^{Z-t_{i,b}}} \in \mathbb{G}_{n'}.$$

Afterwards, the keys may be transmitted to the user u through secure channels.

In some embodiments, a EncDelegate algorithm EncDelegate(GP, MK, $\mathcal{P}$) takes GP, MK, and a data owner's access control policy $\mathcal{P}$ as the input. It may output the partially encrypted header $\widehat{\mathcal{H}}_\mathcal{P}$ for the data owner to perform further encryption. In some embodiments, the data owner first defines the access control policy of attribute constraints as $\mathcal{P} = \{\rho_i, \bar{\rho}_i\} A_i \in \mathbb{A}$ over all attributes, and sends $\mathcal{P}$ to a trusted Encryption Service Provider to delegate the major part of encryption overhead if necessary. The values $\{\rho_i, \bar{\rho}_i\}$ may correspond to the attribute constraint $[t_{i,j}, t_{i,k}]$ if the policy does not designate negative attributes or wildcards over $A_i$. Upon receiving $\mathcal{P}$, the Encryption Service Provider may first set $\rho_i$ and $\bar{\rho}_i$ based on $\mathcal{P}$'s requirement of the range relationship $\mathcal{R}_i$ over the attribute $A_i$.

The Encryption Service Provider may set $\rho_i = t_{i,j}$ and $\bar{\rho}_i = t_{i,k}$ if there exists $\mathcal{R}_i := R$ over the attribute $A_i$. The Encryption Service Provider may set $\rho_i = t_{i,k}$ and $\bar{\rho}_i = t_{i,j}$ if there exists $\mathcal{R}_i := R'$ over the attribute $A_i$. The Encryption Service Provider may set $\rho_i = t_{i,0}$ and $\bar{\rho}_i = t_{i,0}$ if there exists $\mathcal{R}_i := R^-$ (negative attribute) over the attribute $A_i$. The Encryption Service Provider may set $\rho_i = t_{i,n_i}$ and $\bar{\rho}_i = t_{i,0}$ if there exists $\mathcal{R}_i := R^*$ (wildcard) over the attribute $A_i$. Afterward, the Encryption Service Provider may compute $$v_\mathcal{P} = v_{\{\rho_i, \bar{\rho}_i\} A_i \in \mathbb{A}} = \varphi \Pi_{A_i \in \mathbb{A}} \lambda_i^{\rho_i} \mu_i^{Z-\bar{\rho}_i}.$$

Accordingly, the Encryption Service Provider may generate a partially encrypted header $\mathcal{R}$ as $\mathcal{R} = (v \mathcal{P} w, H(A))$ and may send it to the data owner for further encryption.

In some embodiments, a Encrypt algorithm Encrypt (GP, $\mathcal{R}$)) takes GP and $\mathcal{R}$ as the input. It may create a secret $\varepsilon$ and output the session key $K_\varepsilon$ and the ciphertext header $\mathcal{H}_\mathcal{P}$ such that only the data users with attribute ranges satisfying the access control policy can decrypt the message. In some embodiments, upon receiving the partially encrypted header $\mathcal{R}$, the data owner may generate a random secret $\varepsilon \in \mathbb{Z}_n$. The Encrypt algorithm may compute $C = h^\varepsilon$ and the session key $ek = e(g^\alpha, w)^\varepsilon$. To improve efficiency, the Encrypt algorithm may first generate a random key ak to encrypt the target message and may use ek to encrypt a random key ak with symmetric key encryption $\mathbb{E}_{ak}(\cdot)$. The Encrypt algorithm may output the ciphertext header $H_\mathcal{P} = (\mathbb{E}_{ek}(ak), C, E_\varepsilon E'_\varepsilon) = (\mathbb{E}_{ek}(ak), h^\varepsilon, (v_\mathcal{P} w)^\varepsilon, (H(A))^\varepsilon)$ and transmit $\mathcal{H}_\mathcal{P}$ and the encrypted message along with $\mathcal{P}$ to the cloud for storage.

In some embodiments, a DecDelegate algorithm DecDelegate($\mathcal{H}_\mathcal{P}$, $PK_u$, $\mathcal{L}_u$, $\mathcal{P}$) takes input of the ciphertext header H, data user u's public key $PK_u$ and the access control policy $\mathcal{P}$. It may output the partially decrypted header $\widehat{\mathcal{H}}_\mathcal{P}$ to the data user for further decryption. In some embodiments, a data user u may delegate his/her delegation key $DK_u$ and claimed attribute ranges $\mathcal{L}_u$ to the cloud. Upon receiving $DK_u$ and $\mathcal{L}_u$, the cloud may check if $\mathcal{L}_u$ satisfies $\mathcal{P}$ over all attributes. If so, the cloud may compute $(v_\mathcal{P})^{r_u}$ from $(v\mathcal{L}_u)^{r_u}$ as shown below:

$$(v_{\mathcal{P}})^{r_u} = (v_{\{\rho_i, \overline{\rho}_i\} A_i \in \mathbb{A}})^{r_u}$$

$$= F_{\{t_{i,a} \leq \rho_i, t_{i,b} \geq \overline{\rho}_i\} A_i \in \mathbb{A}}((v_{\mathcal{L}_u})^{r_u})$$

$$= F_{\{t_{i,a} \leq \rho_i, t_{i,b} \geq \overline{\rho}_i\} A_i \in \mathbb{A}}((v_{\{t_{i,a}, t_{i,b}\} A_i \in \mathbb{A}})^{r_u})$$

$$= ((v_{\{t_{i,a}, t_{i,b}\} A_i \in \mathbb{A}})^{r_u})^{\prod_{A_i \in \mathbb{A}} \lambda_i^{\rho_i - t_{i,a}} \mu_i^{t_{i,b} - \overline{\rho}_i}}$$

$$= \left(\varphi^{r_u \prod_{A_i \in \mathbb{A}} \lambda_i^{t_{i,a}} \mu_i^{Z - t_{i,b}}}\right)^{\prod_{A_i \in \mathbb{A}} \lambda_i^{\rho_i - t_{i,a}} \mu_i^{t_{i,b} - \overline{\rho}_i}}$$

$$= \left(\varphi^{\prod_{A_i \in \mathbb{A}} \lambda_i^{\rho_i} \mu_i^{Z - \overline{\rho}_i}}\right)^{r_u} \in \mathbb{G}_{n'}$$

where $$v_{\mathcal{P}} = v_{\{\rho_i, \overline{\rho}_i\} A_i \in \mathbb{A}} \text{ and } v_{\mathcal{L}_u} = v_{\{t_{i,a}, t_{i,b}\} A_i \in \mathbb{A}}.$$

The cloud may send $\widehat{\mathcal{H}}_{\mathcal{P}} = ((v\mathcal{P})^{r_u}, \mathcal{H}_{\mathcal{P}})$ along with the ciphertext to the data user for further decryption.

In some embodiments, a Decrypt algorithm Decrypt $(SK_u, \widehat{\mathcal{H}}_{\mathcal{P}})$ takes input of the partially decrypted ciphertext header $\widehat{\mathcal{H}}_{\mathcal{P}}$ and the data user's private key $PK_{\mathcal{L}_u}$. It may perform further decryption over $\widehat{\mathcal{H}}_{\mathcal{P}}$ with $PK_{\mathcal{L}_u}$ and output the session key ek to decrypt the encrypted message. In some embodiments, upon receiving $\widehat{\mathcal{H}}_{\mathcal{P}}$ from the cloud, a data user u may first compute $(v\mathcal{P})^{r_u} D_2^{(u)} = (v\mathcal{P}w)^{r_u}$. the cloud may compute:

$$\Gamma(\varepsilon) \leftarrow \frac{e(D_1^{(u)}, E_\varepsilon)}{e((v_p w)^{r_u}, E'_\varepsilon)} = \frac{e(g^{\tau_u}(H(A))^{\frac{\varepsilon}{\beta}}, (v_p w)^\varepsilon)}{e((v_p w)^{r_u}, (H(A))^\varepsilon)}$$

$$= \frac{e(g^{\tau_u}, (v_p w)^\varepsilon) \cdot e((H(A))^{r_u}, (v_p w)^\varepsilon)}{e((v_p w)^{r_u}, (H(A))^\varepsilon)}$$

$$= e(g^{\tau_u}, (v_p)^\varepsilon) \cdot e(g^{\tau_u}, w^\varepsilon)$$

$$= e(g^{\tau_u}, w^\varepsilon).$$

where $e(g^{\tau_u}, (v\mathcal{P})^\varepsilon) = 1$. Accordingly, the data user may derive the session key ek as shown below:

$$ek = \frac{e(C, D_0^{(u)})}{\Gamma(\varepsilon)} = \frac{e\left((w^\beta)^\varepsilon, g^{\frac{\alpha + \tau_u}{\beta}}\right)}{e(g, w)^{\tau_u \varepsilon}} = e(g^\alpha, w)^\varepsilon$$

With the session key ek, the data user may first retrieve the random key ak by decrypting $\mathbb{E}_{ek}(ak)$ and then may derive the encrypted data with ak.

In some embodiments, a security model may be provided. In some embodiments, the Trust Authority and the Encryption Service Provider may be assumed to be fully trustworthy, and may not collude with other parties. However, data users may attempt to obtain unauthorized access to data beyond their privileges. In some embodiments, if a Cloud Provider is considered semi-honest, the CCP-CABE scheme needs to be resistant against attacks.

In some embodiments, the CCP-CABE scheme is resistant to a Key Collusion Attack (KCA). In a normal case, each data user may possess pre-assigned public key and private key from Trust Authority based on his/her attribute ranges. However, malicious data users may attempt to derive new private keys to reveal data protected by a multi-dimensional attribute range policy either individually or by collusion. In considering a collusion attack, security in dealing with a KCA may be evaluated by a game with multiple steps.

In a Setup step, a challenger may run Setup algorithm. The challenger may give an adversary the global parameters and keep private keys.

In a Learning step, the adversary may query the challenger on behalf of a selected number of users $\{\mu_l\}_{1 \leq l \leq U}$ with attribute ranges $\{\mathcal{L}_{ul}\}_{1 \leq l \leq U}$ by invoking KeyGen algorithm. The challenger may respond by giving private keys $\{SK_{\mathcal{L}_{ul}}, DK_{\mathcal{L}_{ul}}\}_{1 \leq l \leq U}$ to the adversary in return.

In a Challenge step, the challenger may send a challenge on behalf of user u' to the adversary.

In a Response step, the adversary may output $SK_{\mathcal{L}_{u'}}$ with respect to user u'. If $SK_{\mathcal{L}_{u}}$ is valid and can bring more privileges for user u', then the adversary wins the game.

In some embodiments, the CCP-CABE scheme is resistant to a Chosen Delegation Key and Ciphertext Attack (CDKCA). In some embodiments, semi-honest cloud providers may comply with protocols and output the correct results, but are tempted to derive the information from the ciphertext header with the delegation keys from the data users without the permission of data owners. In considering a CDKCA attack, security may be evaluated by a game with multiple steps.

In a Setup step, a challenger may run Setup algorithm. The challenger may give an adversary the global parameters and keep private keys.

In a Learning step, the adversary may query the challenger on behalf of a polynomial number of eligible users $\{u_l\}_{1 \leq l \leq U}$ with attribute ranges $\{\mathcal{L}_{ul}\}_{1 \leq l \leq U}$ and $\mathcal{P}$ by invoking the DecDelegate algorithm. All the users may be able to derive session key from ciphertext header. The challenger may response by giving delegation keys $\{DK_{\mathcal{L}_{ul}}\}_{1 \leq l \leq U}$ to the adversary in return.

In a Challenge step, the challenger may send a challenge ciphertext header to the adversary. The ciphertext header may be decrypted by the users mentioned above with their private keys.

In a Response step, the adversary may output the session key from the challenge ciphertext header. If the session key is valid, the adversary wins the game.

Application Scenarios

Figure 4:
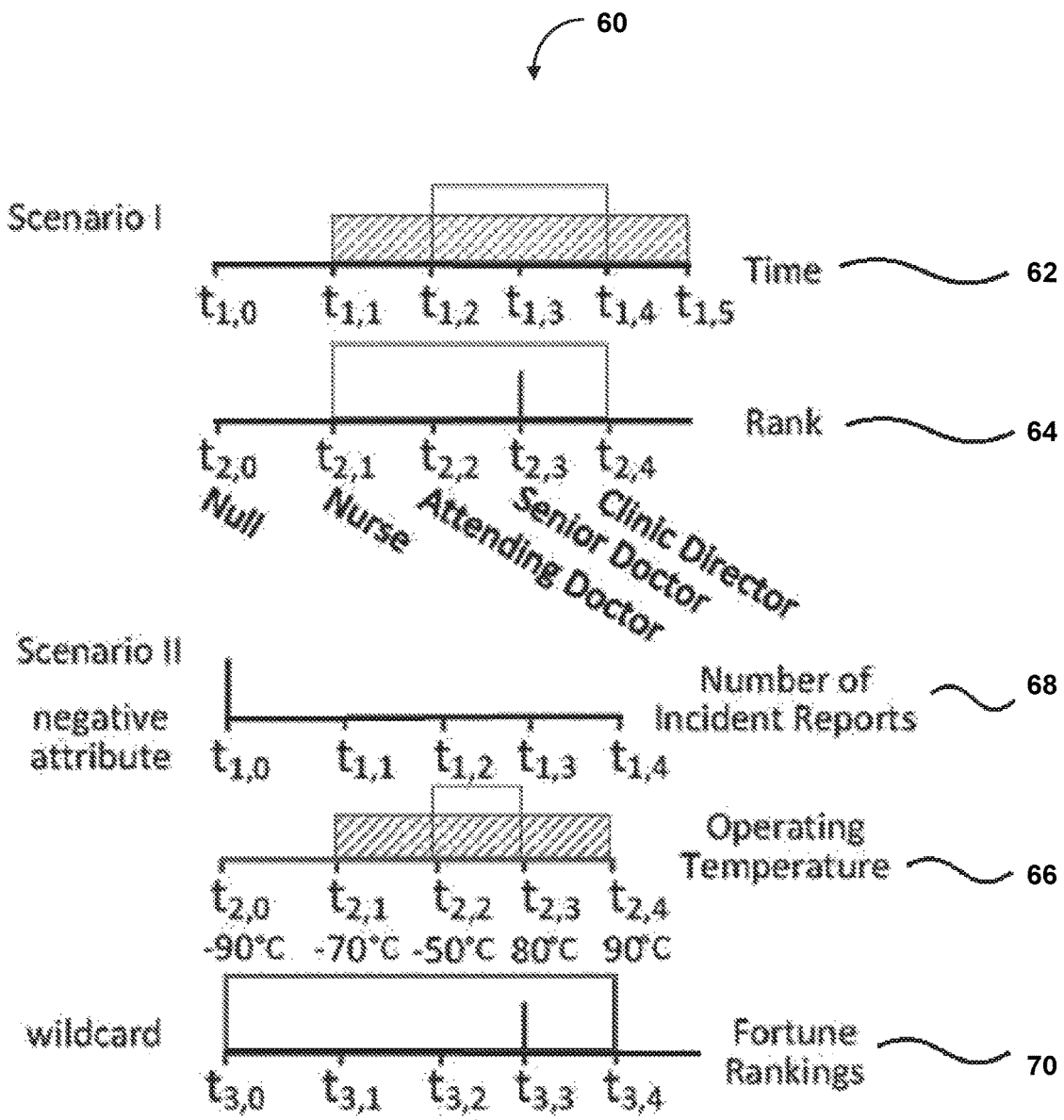
FIG. 4 depicts an exemplary embodiment that illustrates how the disclosed CCP-CABE scheme can adapt for multiple different range relationships.

FIG. 4 depicts an exemplary embodiment 60 that illustrates how the disclosed CCP-CABE scheme can adapt for multiple different range relationships. Two simple examples may be used to illustrate how CCP-CABE can adapt for multiple different range relationships In the telemedicine example of FIG. 1, a data owner applies the range relationship R, R' over attributes $A_2$, $A_2$ respectively in the access control policy $\mathcal{P}$. The "Time" attribute 62 takes value out of the integer set $\{t_{1,0}, t_{1,1}, t_{1,2}, t_{1,3}, t_{1,4}, t_{1,5}\}$ representing different timestamps, and the "Rank" attribute 64 takes value from the integer set $\{t_{2,0}, t_{2,1}, t_{2,2}, t_{2,3}, t_{2,4}, t_{2,5}\}$ representing different positions in a clinic. It can be learnt that the attribute ranges of the data user are $\mathcal{L}_u = \{[t_{1,1}, t_{1,5}], [t_{2,3}, t_{2,3}]\}$, and the attribute range constraints designated by the data owner are $\{[t_{1,2}, t_{1,4}], [t_{2,1}, t_{2,4}]$ $t_{2,4}]\}$. The CCP-CABE may then perform the following operations associated with MRDF. For example, the algorithm KeyGen computes:

$$v_{\mathcal{L}_u} = v_{\{t_{i,a},t_{i,b}\}A_i \in \mathbb{A}} = \varphi^{\prod A_i \in \mathbb{A} \lambda_i^{t_{i,a}} \mu_i^{Z-t_{i,b}}} = \varphi^{\lambda_1^{t_{1,1}} \lambda_2^{t_{2,3}} \mu_1^{Z-t_{1,5}} \mu_2^{Z-t_{2,3}}},$$

The algorithm EncDelegate computes:

$$v_{\mathcal{P}} = v_{\{p_i,\overline{p}_i\}A_i \in \mathbb{A}} = \varphi^{\prod A_i \in \mathbb{A} \lambda_i^{p_i} \mu_i^{Z-\overline{p}_i}} = \varphi^{\lambda_1^{t_{1,2}} \lambda_2^{t_{2,4}} \mu_1^{Z-t_{1,4}} \mu_2^{Z-t_{2,1}}},$$

The algorithm DecDelegate computes:

$$(v_{\mathcal{P}})^{r_u} \leftarrow F_{\{t_{i,a} \le p_i, t_{i,b} \ge \overline{p}_i\}A_i \in \mathbb{A}}((v_{\mathcal{L}_u})^{r_u}) =$$
$$\left(\varphi^{r_u \lambda_1^{t_{1,1}} \lambda_2^{t_{2,3}} \mu_1^{Z-t_{1,5}} \mu_2^{Z-t_{2,3}}}\right)^{\Delta} = \left(\varphi^{\lambda_1^{t_{1,2}} \lambda_2^{t_{2,4}} \mu_1^{Z-t_{1,4}} \mu_2^{Z-t_{2,1}}}\right)^{r_u}.$$

where $$\Delta = \lambda_1^{t_{1,2}-t_{1,1}} \mu_2^{t_{2,4}-t_{2,3}} \mu_1^{t_{1,5}-t_{1,4}} \mu_2^{t_{2,3}-t_{2,1}}.$$

In another example shown by FIG. 4, an organization may plan to select suppliers from electronic device manufacturers who produce electronic devices with the same intended use. The products of the qualified manufacturers should meet three requirements: i) the operating temperature range 66 of the electronic devices must cover the temperature range [−50° C., 80° C.]; ii) the electronic devices should have never received any incident reports 68 in the past (i.e., negative attribute); and iii) the fortune ranking 70 of the manufacturer is not concerned (i.e., wildcard). In the embodiment shown, the attribute ranges of the manufacturer are $\{[t_{1,0}, t_{1,0}], [t_{2,1}, t_{2,4}], [t_{3,3}, t_{3,3}]\}$, and the attribute range constraints designated by the organization are $\{[t_{1,0}], [t_{2,2}, t_{2,3}], [t_{3,0}, t_{3,4}]\}$ where $t_{1,0}, t_{1,0}, t_{3,0} > 0$ and $t_{1,0}$ implies there are no incident records. The CCP-CABE may then perform the following operations associated with MRDF. The algorithm KeyGen computes:

$$v_{\mathcal{L}_u} =$$
$$v_{\{t_{i,a},t_{i,b}\}A_i \in \mathbb{A}} = \varphi^{\prod A_i \in \mathbb{A} \lambda_i^{t_{i,a}} \mu_i^{Z-t_{i,b}}} = \varphi^{\lambda_1^{t_{1,0}} \lambda_2^{t_{2,1}} \lambda_3^{t_{3,3}} \mu_1^{Z-t_{1,0}} \mu_2^{Z-t_{2,4}} \mu_3^{Z-t_{3,3}}},$$

The algorithm EncDelegate computes:

$$v_{\mathcal{P}} = v_{\{p_i,\overline{p}_i\}A_i \in \mathbb{A}} = \varphi^{\prod A_i \in \mathbb{A} \lambda_i^{p_i} \mu_i^{Z-\overline{p}_i}} = \varphi^{\lambda_1^{t_{1,0}} \lambda_2^{t_{2,2}} \lambda_3^{t_{3,4}} \mu_1^{Z-t_{1,0}} \mu_2^{Z-t_{2,3}} \mu_3^{Z-t_{3,0}}},$$

where $$\Delta = \lambda_2^{t_{2,2}-t_{2,1}} \lambda_3^{t_{3,4}-t_{3,3}} \mu_2^{t_{2,4}-t_{2,3}} \mu_3^{t_{3,3}-t_{3,0}}.$$

Extended CCP-CABE

In some embodiments, the use of CCP-CABE may extend over multiple attribute domains. In some cases, multiple attribute domains may be required by independent organizations such that each organization can run an Attribute Authority (AA) to host its own attribute domain. Correspondingly, each AA may hand out secret keys for a distinct set of attributes to reflect the users' attribute values within an attribute domain. The failure of some attribute authorities may not impact the operation of other AAs. Accordingly, only the users with attribute ranges that satisfy the attribute constraints across multiple attribute domains may access that data. In addition, different attribute domains may be at different levels of confidentiality from the perspectives of different data owners, and the data owners may be able to embed the levels of confidentiality associated with attribute domains into the access control policy dynamically.

As an example, a military student's attributes associated with the army may be more confidential than his/her attributes associated with the enrolled university. Therefore, CCP-CABE can be used as a building block to an Extended CCP-CABE (ECCP-CABE). ECCP-CABE can prioritize different attribute domains to reflect different levels of confidentiality across domains. In ECCP-CABE, if one attribute range of the data user cannot satisfy the access policy in the corresponding attribute domain, then the decryption process may stop and the access policy over the remaining attribute domains may still be hidden. Table 2 lists the commonly used symbols in ECCP-CABE.

TABLE 2

Notations for ECCP-CABE

| Notation | Description |
| --- | --- |
| $\mathbb{A}_x, \mathbb{A}_{x,i}$ | the x-th attribute domain and the i-th attribute in $\mathbb{A}_x$ |
| $m_x$ | the number of attributes in $\mathbb{A}_x$ |
| $n_{x,i}$ | the maximum number of attribute values in $\mathbb{A}_{x,i}$ |
| $\mathcal{P}_x$ | the data owner's access control policy in $\mathbb{A}_x$ |
| $\mathcal{L}_{x,u}$ | the data user u's attribute ranges in $\mathbb{A}_x$ |
| X | the total number of attribute domains |
| $[t_{x,i,a}, t_{x,i,b}]$ | the attribute range on attribute $\mathbb{A}_{x,i}$ possessed by a data user |
| $[t_{x,i,j}, t_{x,i,k}]$ | the range constraint on attribute $\mathbb{A}_{x,i}$ defined by $\mathcal{P}_x$ |
| $\rho_{x,i}, \overline{\rho}_{x,i}$ | the bound values associated with $[t_{x,i,j}, t_{x,i,k}]$; it depends on the range relationship over $\mathbb{A}_{x,i}$ |
| $\mathcal{H}_{\mathcal{P}_X}$ | the cipher derived from encrypting the concatenation of $\mathcal{P}_x$ and $\mathcal{H}_{\mathcal{P}_{x-1}}$ |

In some embodiments of ECCP-CABE, each AA generates the master key and global parameters along with users' keys associate in the AA's own attribute domain using the same Setup and KeyGen in CCP-CABE. The data owners may delegate the encryption overhead to a trusted Encryption Service provider as with EncDelegate in CCP-CABE. In some embodiments, the differences between CCP-CABE and ECCP-CABE lies in the algorithms of Encryption and Decryption.

In some embodiments, a ECCP-CABE Encryption algorithm is used. From the perspective of a data owner, different attribute domains may be at different levels of confidentiality. Accordingly, the data owner may sort AAs in descending order from the most confidential attribute domain to the least confidential attribute domain and derive $(\mathbb{A}_1, \ldots, \mathbb{A}_x)$. Upon receiving the partially encrypted header $\mathcal{H}_{\mathcal{P}}$, the data owner may generate a random secret $\varepsilon_x \in \mathbb{Z}_n$ for each $\mathbb{A}_x$. The Encryption algorithm may compute $C_x = h_x^{\varepsilon_x}$ and $ek_x = H_1(e(g_x^{\alpha_x}, w_x)^{\varepsilon_x})$ for each $\mathbb{A}_x$ with $H_1 : \mathbb{G}_T\mathbb{P} \to \{0,1\}^*$, and generate a random key ak to encrypt the target message.

To embed levels of confidentiality into the policy, the data owner may first start from the most confidential $\mathbb{A}_1$ and may use $ek_1$ to encrypt ak to get $\mathcal{H}_{\mathcal{P}_1} = \mathcal{P}_1 \| \mathbb{E}_{ek_1}(ak)$ where $\mathcal{P}_1$ denotes the policy over $\mathbb{A}_1$ and $\mathbb{E}_{ek_1}(\cdot)$ denotes the symmetric encryption using $ek_1$. The data owner may move on to the second most confidential $\mathbb{A}_2$ and compute $\mathcal{H}_{\mathcal{P}_2} = \mathcal{P}_2 \| \mathbb{E}_{ek_2}(\mathcal{H}_{\mathcal{P}_1})$. The process may proceed until the data owner moves on to the least confidential $\mathbb{A}_X$ and computes $\mathcal{H}_{\mathcal{P}_X} = \mathcal{P}_X \| \mathbb{E}_X(\mathcal{H}_{\mathcal{P}_{X-1}})$. The Encrypt algorithm may output the ciphertext header $$\mathcal{H}_{\mathcal{P}} = (\mathcal{H}_{\mathcal{P}_X}, \{C_\chi, E_{\varepsilon_\chi}, E'_{\varepsilon_\chi}\}_{1 \leq \chi \leq X})$$

where $$(E_{\varepsilon_\chi}, E'_{\varepsilon_\chi}) = ((v\mathcal{P}_\chi w_\chi)^{\varepsilon_\chi}, (H(A_\chi))^{\varepsilon_\chi}),$$

and transmit $\mathcal{H}_{\mathcal{P}}$ and the encrypted message to a cloud for storage.

In some embodiments, a ECCP-CABE Decryption algorithm is used. A cloud may first transmit $\mathcal{H}_{\mathcal{P}_X}$ to a data user u such that the data user u knows the corresponding policy $\mathcal{P}_X$ over the least confidential attribute domain $A_X$. Upon receiving $\mathcal{H}_{\mathcal{P}_X}$, the data user u may check if $\mathcal{L}_{X,u}$ satisfies $\mathcal{P}_X$. If so, the data user u may delegate his/her delegation key $DK_{X,u}$ and claimed attribute ranges $\mathcal{L}_{X,u}$ to the cloud.

ECCP-CABE may then invoke the DecDelegate algorithm. Upon receiving $DK_{X,u}$ and $\mathcal{L}_{X,u}$ the cloud may derive $(v_X)^{r_{X,u}}$ from $(v_{\mathcal{L}_{X,u}})^{r_{X,u}}$ in the same manner as CCP-CABE, and then may send $(v_{\mathcal{P}_X})^{r_{X,u}}$ to the data user for further decryption.

ECCP-CABE may then invoke the DecDelegate algorithm. As with CCP-CABE, the data user u may compute $$\Gamma(\varepsilon_\chi) = \frac{e(D_\chi^{(u)}, E_{\varepsilon_\chi})}{e((v_{p_\chi} w_\chi)^{r_{X,u}}, E'_{\varepsilon_\chi})},$$

Data user u may compute $$e(g_\chi^{\alpha_\chi}, w_\chi)^{\varepsilon_\chi} = \frac{e(C_\chi, D_{\chi,0}^{(u)})}{\Gamma(\varepsilon_\chi)} \text{ where } D_{\chi,0}^{(u)} = g_\chi^{\frac{\alpha_\chi + \tau_{\chi,u}}{\beta_\chi}}.$$

The data user u may then compute $ak_\chi = H_1(e(g_\chi^{\alpha_\chi}, w_\chi)^{\varepsilon_\chi})$ and derive $\mathcal{H}_{\mathcal{P}_{X-1}}$. The data owner u and the cloud may move on to $A_{X-1}$ and invoke the algorithms DecDelegate and Decrypt again. This process proceeds recursively until they reach $A_1$ and retrieve the session key ek. After retrieving the session key, the data user may derive the encrypted data. This onion-like decryption may enable a gradual exposure of the access control policy from the least confidential attribute domain to the most confidential attribute domain. This significantly preserves the privacy of access control policy. The data user is unable to decrypt one more level to discover the policy over the next more confidential attribute domain if his/her attribute ranges cannot satisfy the policy over the current attribute domain.

Security Analysis

In some embodiments of ECCP-CABE, each attribute authority may generate parameters and operate independently in its own attribute domain as with CCP-CABE. Accordingly, the security of ECCP-CABE fully depends on CCP-CABE. In some embodiments, security for MRDF is realized by ensuring that MRDF is hard to invert and its one-way property can be guaranteed.

Some embodiments of CCP-CABE and ECCP-CABE provide security against Key Collusion Attacks (KCA). In some embodiments, the security of CCP-CABE and ECCP-CABE schemes against KCA may rely on the confidentiality of $r_u$ associated with user u's identity. A user could leverage key collusion attacks to extend his/her attribute range and increase privileges. For example, a user u' with attribute ranges $\mathcal{L}_{u'} = \{[t'_{i,a}, t'_{i,b}]\} A_i \in \mathbb{A}$ may attempt to transfer another user u's attribute ranges $\mathcal{L}_u = \{[t_{i,a}, t_{i,b}]\} A_i \in \mathbb{A}$ into his/her own key, such that he/she can obtain more privilege over some attribute $A_i$ as there exists $t_{i,a} < t'_{i,a} < t'_{i,b} < t_{i,b}$. In other words, user u' may depend on the prior knowledge of $$(SK_u, DK_u) = (D_0^{(u)}, D_1^{(u)}, D_2^{(u)}, DK_u) = \left(g^{\frac{\alpha + \tau_u}{\beta}}, g^{\tau_u}(H(A))^{r_u}, w^{r_u}, (v_{\mathcal{L}_u})^{r_u}\right),$$

$$(SK_{u'}, DK_{u'}) =$$

$$(D_0^{(u')}, D_1^{(u')}, D_2^{(u')}, DK_{u'}) = \left(g^{\frac{\alpha + \tau_{u'}}{\beta}}, g^{\tau_{u'}}(H(A))^{r_{u'}}, w^{r_{u'}}, (v_{\mathcal{L}_{u'}})^{r_{u'}}\right).$$

and he/she may launch KCA-I attacks to derive new keys $$\left(g^{\frac{\alpha + \tau_{u'}}{\beta}}, g^{\tau_{u'}}(H(A))^{r_u} w^{r_u}, (v_{\mathcal{L}_u})^{r_u}\right)$$

by exchanging $g^{\tau_{u'}}$ or $(H(A))^{r_{u'}}$ with some known keys. In addition, the colluders could also commit KCA-II attacks to forge new keys $$\left(g^{\frac{\alpha + \tau_{u'}}{\beta}}, g^{\tau_{u'}}(H(A))^{r_u}, w^{r_{u'}}, (v_{\mathcal{L}_u})^{r_{u'}}\right)$$

by replacing $v_{\mathcal{L}_{u'}}$, with some new v $\mathcal{L}_u$ to get some advantage in their privileges, where there exists $t_{i,a} < t'_{1,a} < t'_{i,b} < t_{i,b}$ for some attribute $A_i$ in $\mathcal{L}_u$. In some embodiments, CCP-CABE and ECCP-CABE are resistant against KCA-I and KCA-II attacks by making it infeasible for the users to forge new keys with more privileges by key collusion.

Some embodiments of CCP-CABE and ECCP-CABE provide security against Chosen Delegation Key and Ciphertext Attacks (CDKCA). In some embodiments, the DLP assumption makes it is hard for a cloud provider to derive e from the ciphertext header ($C = h^\varepsilon$, $E_\varepsilon = (v\mathcal{P} w)^\varepsilon$, $E'_\varepsilon = (H(A))^\varepsilon$). The cloud provider cannot obtain any advantage in CDKCA with a polynomial number of delegation keys and ciphertext headers. The delegation keys $DK_{\mathcal{L}_u}$ contain only part of the information, and $r_u$ prevents applying one user's delegation key to another user's decryption process. Additionally, the secret keys are not disclosed to the cloud providers, so it is infeasible to cancel out $r_u$, $\tau_u$ and derive $ek = e(g^\alpha, w)^\varepsilon$ without the secret keys. Consequently, it is infeasible for an honest-but-curious cloud provider to reveal encrypted content by taking advantage of the ciphertext and the delegation keys.

Performance Evaluation

In some embodiments, encryption and decryption offloading in a CCP-CABE scheme significantly reduce the computational cost of lightweight devices, and the CCP-CABE scheme is suitable for resource-constrained data owners and data users.

A complexity Analysis may be performed to compare the CCP-CABE scheme with CBE, ABE-AL, and CP-ABE schemes. CBE and ABE-AL utilize different forward/backward derivation functions for comparison-based encryption and decryption. CP-ABE and its variants use bit-wise matching method to implement integer comparison for comparison-based access control. CCP-CABE may only focus on the pairing and exponentiation operations while neglecting the hash and multiplication cost in both $\mathbb{G}$ and $\mathbb{G}_T$ as well as symmetric encryption/decryption cost, since they are much faster compared to the paring and exponentiation operations. CCP-CABE may use similar notations to CBE for these operations in both $\mathbb{G}$ and $\mathbb{G}_T$. For illustrative purposes, B may indicate the bit form of the upper and lower bound values of the attribute range for comparison in CP-ABE and P may denote bilinear pairing cost. $E(\mathbb{G})$ and $E(\mathbb{G}_T)$ may refer to the exponential computation overhead in $\mathbb{G}$ and $\mathbb{G}_T$ respectively. $E(\mathbb{Z}_n^*)$ may refer to the exponential computation overhead in $\mathbb{Z}_n^*$. $\mathcal{J}$ may represent the number of leaves in an access tree and S may represent attributes involved in encryption and decryption. L may be the ciphertext size resulting from symmetric encryption with the session key ek.

Differences of key size and ciphertext size between these schemes may be shown in Table 3.

TABLE 3

Comparison of key size and ciphertext size

| Scheme | Key Size | Ciphertext Size |
|---|---|---|
| CP-ABE | $(1 + 2|S||B|)l_\mathbb{G}$ | $l_{\mathbb{G}_T} + (2|\mathcal{J}||B| + 1) + 1)l_\mathbb{G}$ |
| CBE | $(1 + 4|S|)l_\mathbb{G}$ | $(4|\mathcal{J}| + 1)l_\mathbb{G}$ |
| ABE-AL | $(1 + |S|)l_\mathbb{G} + |S| l_{\mathbb{Z}_n}$ | $l_{G_T} + (2|\mathcal{J}| + 1)l_\mathbb{G}$ |
| CCP-CABE | $4l_\mathbb{G}$ | $L + 3l_\mathbb{G}$ |

For illustrative purposes, it is clear that the key size in CP-ABE, CBE and ABE-AL grow linearly with the number of associate attributes S. The ciphertext size in these three schemes also increases proportionally with the number of attributes $\mathcal{J}$ in the access tree. In contrast, CCP-CABE keeps both the key size and ciphertext size constant irrespective of the number of involved attributes. Table 4 gives the comparison between these schemes regarding the total communication cost on mobile devices including key generation, delegation, encryption and decryption.

TABLE 4

Comparison of communication overhead

| Scheme | Communication Cost |
|---|---|
| CP-ABE | $2l_{G_T} + (2|S||B| + 4|\mathcal{J}||B| + 3) l_\mathbb{G}$ |
| CBE | $3l_{G_T} + (3 + 10|S| + 8|\mathcal{J}|) l_\mathbb{G}$ |
| ABE-AL | $2l_{G_T} + (2 + |S| + 4|\mathcal{J}|) l_\mathbb{G} + |S| l_{\mathbb{Z}_n}$ |
| CCP-CABE | $2L + l_{G_T} + 15 l_\mathbb{G}$ |

For illustrative purposes, it is clear that the communication costs of the first three schemes also grow with the number of related attributes, while the communication cost of CCP-CABE remains constant regardless of the number of attributes. The communication overhead caused by the transmission of $\mathcal{P}$ and $\mathcal{L}_u$ may be discounted. Because these attributes are cleartext, they can be pre-distributed and compressed into a very small size.

The computation overhead of encryption and decryption on mobile devices may be shown in Table 5 and Table 6 respectively.

TABLE 5

Comparison of encryption overhead

| Scheme | Encryption |
|---|---|
| CP-ABE | $P + (1 + 2|\mathcal{J}||B|)E(\mathbb{G})$ |
| CBE | $(1 + 4|\mathcal{J}|)E(\mathbb{G}) + E(\mathbb{G}_T)$ |
| ABE-AL | $(2|\mathcal{J}| + 1)E(\mathbb{G}) + E(\mathbb{G}_T)$ |
| CCP-CABE | $3E(\mathbb{G}) + E(\mathbb{G}_T)$ |

TABLE 6

Comparison of decryption overhead

| Scheme | Decryption |
|---|---|
| CP-ABE | $(2 + 3|S||B|)E(\mathbb{G}_T) + 2|S||B|P$ |
| CBE | $P + (5|S| + 1)E(\mathbb{G})$ |
| ABE-AL | $2|S|P + (|S| + 2)E(\mathbb{G}_T) + 2|S|E(\mathbb{G})$ |
| CCP-CABE | $3P$ |

For illustrative purposes, it may be assumed that both a cloud provider and an Encryption Service Provider are resource-rich in computation capability, making the computation overhead on mobile devices the only concern. The encryption and decryption overhead in CCP-CABE may stay the same irrespective of the number of attributes involved This may be accomplished by offloading all computation-intensive operations to the resource-rich Encryption Service Provider and cloud providers. Conversely, the computation cost of the other three schemes increases with the number of associated attributes.

In some embodiments, ECCP-CABE uses CCP-CABE as a building block, revealing the policy domain by domain unless it reaches the most sensitive attribute domain. Correspondingly, gradual identity exposure (GIE), a variant of CP-ABE, enables the exposure of the access policy attribute by attribute. For illustrative purposes, B indicates the bit form of the upper and lower bound values of the attribute range for comparison, $\mathcal{J}$ represents the number of leaves in the tree and S represents the attributes involved in encryption and decryption in GIE. In addition, there may exist X attribute domains in ECCP-CABE and the size of $\mathcal{H}_{\mathcal{P}_X}$ is L. Therefore, ECCP-CABE can be compared with GIE in terms of key size, ciphertext size, and communication cost associated with encryption, delegation and decryption. This comparison is shown in Table 7. A comparison regarding computation cost between GIE and ECCP-CABE is shown in Table 8.

TABLE 7

Comparison of key size, ciphertext size and communication cost between GIE and ECCP-CABE

| Metric | GIE | ECCP-CABE |
|---|---|---|
| Key Size | $(1 + 2|S||B|)l_\mathbb{G}$ | $4Xl_\mathbb{G}$ |
| Ciphertext Size | $l_{G_T} + (2|\mathcal{J}||B| + 1)l_\mathbb{G}$ | $L + 3Xl_\mathbb{G}$ |
| Comm. Cost | $2l_{G_T} + (2|S||B| + 4|\mathcal{J}||B| + 3)l_\mathbb{G}$ | $l_{G_T} + (1 + X)L + 17Xl_\mathbb{G}$ |

TABLE 8

Comparison of computation cost between GIE and ECCP-CABE

| Operation | GIE | ECCP-CABE |
| --- | --- | --- |
| Encryption | $P + (1 + 2|r||B|)E(\mathbb{G})$ | $3XE(G) + XE(\mathbb{G}_T)$ |
| Decryption | $(2 + 3|S||B|)E(\mathbb{G}_T) + 2|S||B|P$ | $3X 1\mathbb{G}$ |

For illustrative purposes, it can be seen that the key size, ciphertext size and communication cost of GIE grow linearly with the number of associated attributes, while those of ECCP-CABE increase with the number of attribute domains. This also applies to GIE and ECCP-CABE in terms of encryption and decryption cost. In a real-world scenario, the number of attribute domains may usually be smaller than the number of attributes, ensuring that ECCP-CABE may generally be more efficient than GIE in terms of communication and computation cost.

Figure 5:
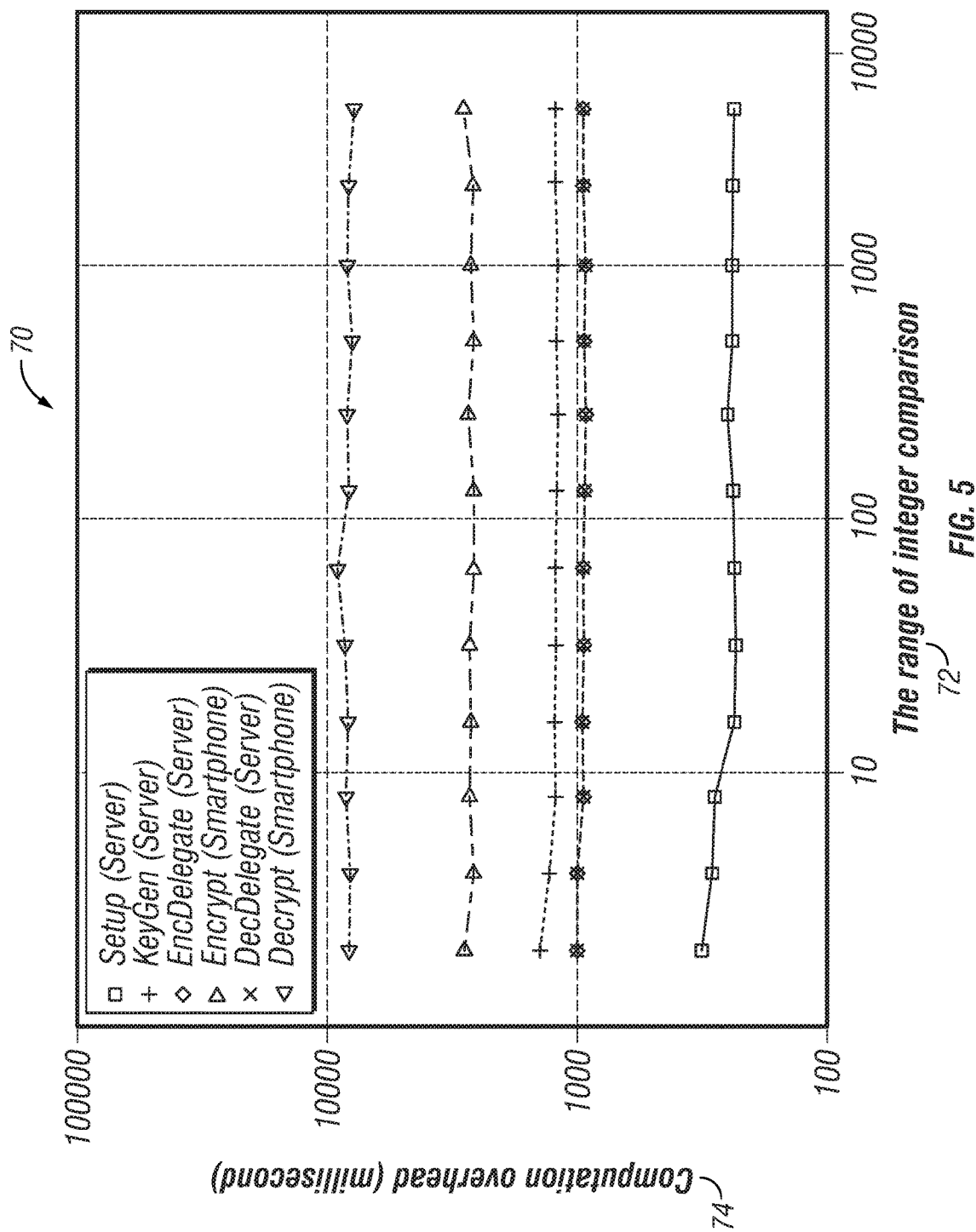
FIG. 5 depicts an exemplary embodiment that illustrates a computational cost of algorithms in CCP-CABE with a different comparison range.
Figure 6:
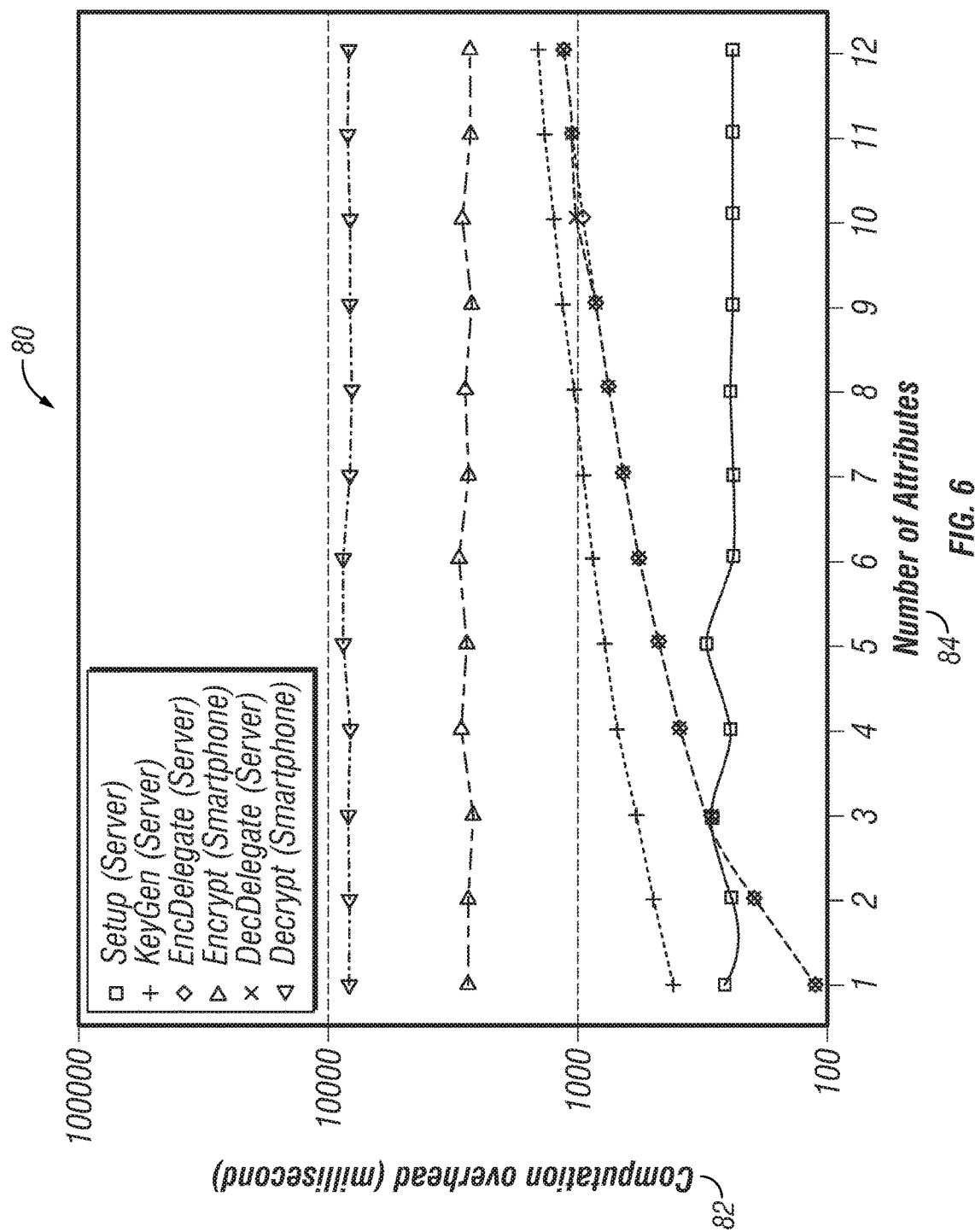
FIG. 6 depicts an exemplary embodiment that illustrates a computational cost of algorithms in CCP-CABE with a different number of attributes.
Figure 7:
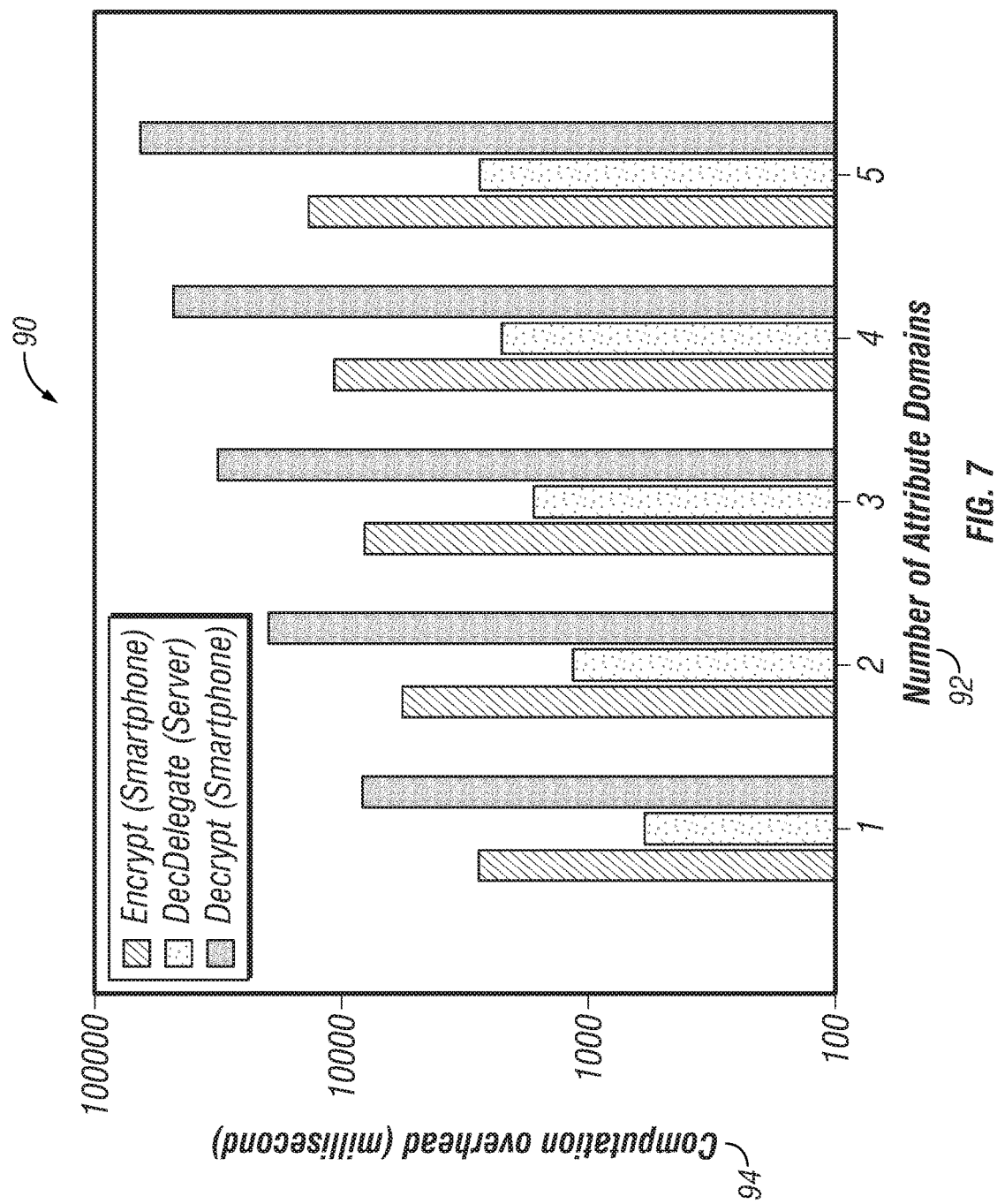
FIG. 7 depicts an exemplary embodiment that illustrates a computational cost of algorithms in CCP-CABE with a different number of attribute domains.

FIGS. 5-7 show exemplary embodiments 70, 80, 90 of the disclosed CCP-CABE scheme implemented on a computing device. In the embodiment shown, the CCP-CABE scheme is implemented on a mobile cloud platform and a smartphone. In the embodiment shown, the Trust Authority, Encryption Service Provider and cloud provider are simulated by virtual machines comprising a CPU and memory hosted by a mobile cloud platform. In the embodiment shown, the mobile device comprises a CPU and memory. In the embodiment shown, the Java Pairing-Based Cryptography (jPBC) library is utilized. In the embodiment shown, bilinear map system S of composite order n where $n=s_1 s_2 p'q'$ and $|p'|=|q'|=256$ bits is used.

FIG. 5 illustrates an embodiment 70 where the impact of the range 72 of integer comparison on the computational costs/overhead 74 of the algorithms in CCP-CABE where the total number of attributes is set as 10. In the embodiment shown, the value range of each attribute is [1, Z] and Z takes the form of $2^X$. The data owner may adopt the range relationship R and designate $$\left[\frac{3}{8}Z, \frac{5}{8}Z\right]$$

as the attribute constraint over each attribute. The attribute range of the data user may be $$\left[\frac{1}{8}Z, \frac{7}{8}Z\right]$$

Therefore, in the embodiment shown, the comparison range is $$\frac{Z}{4}$$

and it grows from 2 to $2^{12}$ as x increases from 3 to 14. This demonstrates that the comparison range 72 has negligible impact over the computational cost 74 of the algorithms in CCP-CABE. This also implies that each attribute can have many integer values for comparison without increasing the computational overhead in real-world settings.

FIG. 6 illustrates an embodiment 80 where the comparison range is fixed as $2^4$. In the embodiment shown, the computational cost 82 of KeyGen, EncDelegate and DecDelegate running on a server grows almost linearly as the number of attributes 84 increases from 1 to 12. Meanwhile, in the embodiment shown, the computational cost 82 of Encrypt and Decrypt remain the same irrespective of the number of attributes 84, which is suitable for resource-constrained mobile devices.

FIG. 7 illustrates an embodiment 90 where each attribute domain has 6 attributes and the comparison range of each attribute is $2^4$. In the embodiment shown, AES-128 is used for recursive encryption and decryption over attribute domains 92. In the embodiment shown, as each attribute authority is only responsible for Setup, KeyGen and EncDelegate in its own domain, its performance is approximately the same as that in CCP-CABE. In the embodiment shown, the computational cost 94 of Encrypt, DecDelegate and Decrypt grows with the number of attribute domains 92. As the number of attribute domains 92 is usually much smaller than the number of attributes, the computational overhead is still acceptable. Therefore, the data owner may associate the policy only with the concerned attribute domains to reduce overhead.

System Embodiments

Those of skill in the art will appreciate that the algorithms and method steps described in connection with embodiments disclosed herein can often be implemented as logic circuitry in electronic hardware, computer software, or combinations of both. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention.

Moreover, the various illustrative algorithms and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the present devices are not intended to be limited to the particular forms disclosed. Rather, they include all modifications and alternatives falling within the scope of the claims, and embodiments other than the one shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method for encrypting data in a computer based processing system using a trust authority with a public key PK and a master key MK, the method comprising:
   sending a request for a partially encrypted header $\tilde{H}$ to the trust authority with a specified access control policy Ps;
   receiving a partially encrypted header computed by the trust authority, wherein the partially encrypted header $\tilde{H}$ is based on the public key PK, the master key MK, and the specified access control policy Ps;
   encrypting data using the partially encrypted header $\tilde{H}$;
   wherein the data is encrypted according to the following algorithm:
   Encrypt($\tilde{H}$)→(H, $K_s$): Given the partially encrypted header, the algorithm produces the session key $K_s$ and ciphertext H={$\mathcal{P}_S$, C, $E_{\bar{S}}$, $E_{\underline{S}}$, $\hat{E}_{\bar{S}}$, $\hat{E}_{\underline{S}}$} to cloud storage; and
   further wherein each part of H is generated as follows:
   1) randomly choosing two secrets $s_1, s_2 \in \mathbb{Z}_n$,
   2) computing the main secret $s=s_1+s_2 \in \mathbb{Z}_n$ and deriving
   $C = sW \in \mathbb{G}$,
   3) producing the session key $K_s = e(G, W)^{\alpha s}$ and using $K_s$ to encrypt the data,
   4) computing $E_{\bar{S}}=s_1 T$ and $E_{\underline{S}}=s_2 T$, and
   5) computing each of $\hat{E}_{\bar{S}}=s_1 \vec{\psi}_{\bar{S}} T \cdot s_1 W = s_1 \vec{\psi}_{\bar{S}} \lambda W \cdot s_1 W = s_1(\lambda \vec{\psi}_{\bar{S}}+1)W$ and $\hat{E}_{\underline{S}}=s_2 \vec{\psi}_{\underline{S}} T \cdot s_2 W = s_2 \vec{\psi}_{\underline{S}} \lambda W \cdot s_2 W = s_2(\lambda \vec{\psi}_{\underline{S}}+1)W$.

2. The method of claim 1, wherein the step of encrypting the data comprises generating the session key $K_s$ and the ciphertext H using the partially encrypted header $\tilde{H}$.

3. The method of claim 1, wherein the computer based processing system is a cloud storage system.

4. The method of claim 1, wherein the size of any key and any ciphertext overhead remains constant without regard to a number of attributes.

5. The method of claim 1, wherein the algorithm term
   H={$\mathcal{P}_S$, C, $E_{\bar{S}}$, $E_{\underline{S}}$, $\hat{E}_{\bar{S}}$, $\hat{E}_{\underline{S}}$} represents ciphertext H being generated as a function of:
   C, the product of the main secret s (the sum of two random secrets $s_1$ and $s_2$) and generator W, which are elements of set $\mathbb{G}$;
   $E_{\bar{S}}$, the product of secret 1 ($s_1$) and $T=\lambda W \in \mathbb{G}$, the product of $\lambda$ and generator W, elements of set $\mathbb{G}$;
   $E_{\underline{S}}$, the product of secret 2 ($s_2$) and $T=\lambda W \in \mathbb{G}$, the product of $\lambda$ and generator W, elements of set $\mathbb{G}$;
   $\hat{E}_{\bar{S}}$ the function of secret 1 ($s_1$), $\lambda$ (an element of the master key), $\vec{\psi}_{\bar{S}}$ (the first part of the partially decrypted header) and generator W; and
   $\hat{E}_{\underline{S}}$, the function of secret 2 ($s_2$), $\lambda$ (an element of the master key), $\vec{\psi}_{\underline{S}}$ (the second part of the partially decrypted header) and generator W.

6. A method of decrypting data, wherein the method comprises:
   storing the data in a computer based processing system, wherein the data includes an encrypted header H and encrypted target data;
   receiving a request for access to the data, wherein the request includes a user identity;
   partially decrypting an encrypted header H when the user is entitled to access the data based on the user's public key PKLU, privilege LU and access control policy Ps;
   sending the partially decrypted header $\tilde{H}$ to the user;
   wherein partially decrypting the header H is performed according to the following algorithm:
   DecDelegate(H, PK$\Lambda_u$, $\Lambda_u$, $\mathcal{P}_S$)→$\tilde{H}$: Given the user's public key PK$\Lambda_u$ and privilege $\Lambda_u$ along with the access control policy $\mathcal{P}_S$, the algorithm outputs $\vec{\psi}_{\bar{S}}$ and $\vec{\psi}_{\underline{S}}$ when $[v_{i,j}, v_{i,k}] \cap [v_{i,a}, v_{i,b}] \neq \emptyset$ for all $A_i \in \mathbb{A}$:

$\vec{F}_{U \leq \bar{S}} (\vec{\psi}_U) = (\vec{\psi}_U)^{\overline{w}_{U\bar{S}}} = (\vec{\pi} \prod_{1 \leq i \leq m} \vec{w}_{i,a})^{\prod_{1 \leq i \leq m}(\overline{w}_{i,(a,k)})} = \vec{\psi}_{\bar{S}} \pmod{n}$ $\vec{F}_{\underline{S} \leq \overline{U}} (\vec{\psi}_{\overline{U}}) = (\vec{\psi}_{\overline{U}})^{\overline{w}_{\underline{S}\overline{U}}} = (\vec{\pi} \prod_{1 \leq i \leq m} \overline{w}_{i,b})^{\prod_{1 \leq i \leq m}(\overline{w}_{i,(j,b)})} = \vec{\psi}_{\underline{S}} \pmod{n};$ where $\vec{w}_{U\bar{S}} = \Pi_{1 \leq i \leq m}(\overline{w}_{i,(a,k)})$ and $\overline{w}_{\underline{S}\overline{U}} = \Pi_{1 \leq i \leq m}(\overline{w}_{i,(j,b)})$;
   and further wherein the algorithm outputs $\tilde{H} = \{H, \vec{\psi}_U - \vec{\psi}_{\bar{S}}, \vec{\psi}_{\overline{U}} - \vec{\psi}_{\underline{S}}\}$ as the partially decrypted header.

7. The method of claim 6, further comprising:
   retrieving a session key $K_s$; Decrypt($\widetilde{SK}_{\mathcal{L}_1}$, $\tilde{H}$)→$K_s$: Given the delegation key $\widetilde{SK}_{\mathcal{L}_1}$ and header $\tilde{H}$, the algorithm performs the following computation:

$$\Gamma(s_1) = e(\vec{A}_u, \hat{E}_{\overline{S}} \cdot (\vec{\psi}_U - \vec{\psi}_{\overline{S}})E_{\overline{S}})$$

$$= e(\vec{A}_u, s_1(\lambda\vec{\psi}_{\overline{S}} + 1)W \cdot (\vec{\psi}_U - \vec{\psi}_{\overline{S}})s_1\lambda W)$$

$$= e(\vec{A}_u, s_1(\lambda\vec{\psi}_{\overline{S}} + 1 + \lambda\vec{\psi}_U - \lambda\vec{\psi}_{\overline{S}})W)$$

$$= e\left(\frac{\gamma_u}{\lambda\vec{\psi}_U + 1}G, s_1(\lambda\vec{\psi}_U + 1)W\right)$$

$$= e(G, W)^{\frac{\gamma_u}{\lambda\vec{\psi}_U+1} \cdot s_1(\lambda\vec{\psi}_U+1)}$$

$$= e(G, W)^{\gamma_u s_1}$$

$$\Gamma(s_2) = e(\vec{A}_u, \hat{E}_{\underline{S}} \cdot (\overleftarrow{\psi}_U - \overleftarrow{\psi}_{\underline{S}})E_{\underline{S}})$$

$$= e(\vec{A}_u, s_2(\lambda\overleftarrow{\psi}_{\underline{S}} + 1)W \cdot (\overleftarrow{\psi}_U - \overleftarrow{\psi}_{\underline{S}})s_2\lambda W)$$

$$= e(\vec{A}_u, s_2(\lambda\overleftarrow{\psi}_{\underline{S}} + 1 + \lambda\overleftarrow{\psi}_U - \lambda\overleftarrow{\psi}_{\underline{S}})W)$$

$$= e\left(\frac{\gamma_u}{\lambda\overleftarrow{\psi}_U + 1}G, s_2(\lambda\overleftarrow{\psi}_U + 1)W\right)$$

$$= e(G, W)^{\frac{\gamma_u}{\lambda\overleftarrow{\psi}_U+1} \cdot s_2(\lambda\overleftarrow{\psi}_U+1)}$$

$$= e(G, W)^{\gamma_u s_2}; \text{ and}$$

deriving $I = \Gamma(s_1) \cdot \Gamma(s_2) = e(G, W)^{\gamma_u s}$.

8. The method of claim 7, further comprising decrypting data utilizing the session key $K_s$.

9. The method of claim 8, wherein the processing system comprises a cloud storage system.

10. The method of claim 6, wherein the access control policy Ps is revealed at an attribute domain level.

11. The method of claim 6, wherein encryption of the header H and the partially decrypting of the encrypted header H are performed over each of a plurality of attribute domains in a batch-processing manner.

12. The method of claim 6, wherein the algorithm terms $$\vec{F}_{\underline{U} \leq \overline{S}}(\vec{\psi}_U) = (\vec{\psi}_U)^{\vec{w}_{\underline{U}\overline{S}}} = (\vec{\pi}^{\prod_{1 \leq i \leq m} \vec{w}_{i,a}})^{\prod_{1 \leq i \leq m}(\vec{w}_{i,(a,k)})} = \vec{\psi}_{\overline{S}} (\bmod n);$$

$$\overleftarrow{F}_{\underline{S} \leq \overline{U}}(\overleftarrow{\psi}_U) = (\overleftarrow{\psi}_U)^{\overleftarrow{w}_{\underline{S}\overline{U}}} = (\overleftarrow{\pi}^{\prod_{1 \leq i \leq m} \overleftarrow{w}_{i,b}})^{\prod_{1 \leq i \leq m}(\overleftarrow{w}_{i,(j,b)})} = \overleftarrow{\psi}_{\underline{S}} (\bmod n); \text{ and}$$

$$\tilde{H} = \{H, \vec{\psi}_U - \vec{\psi}_{\overline{S}}, \overleftarrow{\psi}_U - \overleftarrow{\psi}_{\underline{S}}\} \text{ only if } [v_{i,j}, v_{i,k}] \cap [v_{i,a}, v_{i,b}] \neq \emptyset \text{ for all } A_i \in \mathbb{A}$$

represent the first and second parts of the partially decrypted header $\vec{\psi}_{\overline{S}}$ and $\overleftarrow{\psi}_{\underline{S}}$, respectively, as outputted when the user's attribute range ($A_i$) on the i-th attribute of the $\mathbb{A}$ attribute set $[v_{i,a}, v_{i,b}]$ matches the access control policy's attribute range on attribute $A_i$ $[v_{i,j}, v_{i,k}]$; and wherein the partially decrypted header is outputted as a function of encrypted header H, the difference beween the first part of the public key $\vec{\psi}_U$ and partially decrypted header $\vec{\psi}_{\overline{S}}$ and the difference between the second part of the public key $\overleftarrow{\psi}_U$ and the second part of the partially decrypted header $\overleftarrow{\psi}_{\underline{S}}$.

\* \* \* \* \*